(12) United States Patent
Phuly et al.

(10) Patent No.: US 6,470,578 B1
(45) Date of Patent: Oct. 29, 2002

(54) METHOD AND APPARATUS FOR INDICATING A PATTERN OF INTERSECTION USING A LIGHT COLUMN

(75) Inventors: Ahmed M. Phuly, Coon Rapids, MN (US); Gary Gitelman, New York, NY (US)

(73) Assignee: P&G Development Group, Inc., Coon Rapids, MN (US)

( * ) Notice: Subject to any disclaimer, the term of this patent is extended or adjusted under 35 U.S.C. 154(b) by 0 days.

(21) Appl. No.: 09/670,684

(22) Filed: Sep. 27, 2000

Related U.S. Application Data
(60) Provisional application No. 60/156,497, filed on Sep. 28, 1999.

(51) Int. Cl.⁷ .............................. B25H 7/04; G01B 11/14
(52) U.S. Cl. .............................. 33/286; 33/21.3; 33/529; 33/DIG. 21
(58) Field of Search ....................... 33/286, 227, 27.01, 33/27.02, 21.1, 21.2, 21.3, DIG. 21, 228, 412, 529; 362/302, 303, 304, 285, 287, 418, 419, 431, 553

(56) References Cited

U.S. PATENT DOCUMENTS

| | | | | |
|---|---|---|---|---|
| 1,683,953 A | * | 9/1928 | Carr | 33/529 |
| 2,579,067 A | * | 12/1951 | Cunningham | 356/139 |
| 2,656,606 A | * | 10/1953 | Porter | 33/273 |
| 3,835,541 A | * | 9/1974 | Whitworth | 33/21.3 |
| 4,067,555 A | * | 1/1978 | Vignardet et al. | 266/58 |
| 4,120,095 A | * | 10/1978 | Lebourg | 29/890.148 |
| 4,145,613 A | * | 3/1979 | Bunch | 378/26 |
| 4,208,801 A | * | 6/1980 | Blair | 89/200 |
| 4,315,150 A | * | 2/1982 | Darringer et al. | 250/338.1 |
| 4,502,457 A | * | 3/1985 | Marron | 125/11.14 |
| 4,580,345 A | | 4/1986 | Andrew | 33/21.3 |
| 4,650,952 A | * | 3/1987 | Akeel | 219/121.74 |
| 4,693,567 A | * | 9/1987 | Ozaki | 359/710 |
| 4,725,933 A | * | 2/1988 | Houk | 362/287 |
| 4,807,369 A | * | 2/1989 | Ming-Chin | 33/529 |
| 4,885,967 A | * | 12/1989 | Bell et al. | 83/520 |
| 4,896,015 A | * | 1/1990 | Taboada et al. | 219/121.78 |
| 5,085,525 A | * | 2/1992 | Bartosiak et al. | 374/124 |
| 5,126,928 A | * | 6/1992 | Hughes | 362/287 |
| 5,142,788 A | * | 9/1992 | Willetts | 33/227 |
| 5,359,417 A | * | 10/1994 | Muller et al. | 356/623 |
| 5,368,392 A | * | 11/1994 | Hollander et al. | 374/121 |
| 5,465,493 A | * | 11/1995 | Sobottke et al. | 33/286 |
| 5,528,505 A | * | 6/1996 | Granger et al. | 700/195 |
| 5,588,216 A | * | 12/1996 | Rank et al. | 33/286 |
| 5,860,220 A | | 1/1999 | Gerd | 33/529 |
| 6,019,484 A | * | 2/2000 | Seyler | 362/287 |

FOREIGN PATENT DOCUMENTS

| | | | | |
|---|---|---|---|---|
| SU | 1337662 A | * | 9/1987 | 33/286 |
| SU | 1458201 A | * | 2/1989 | 33/21.3 |

* cited by examiner

*Primary Examiner*—Diego Gutierrez
*Assistant Examiner*—R. Alexander Smith
(74) *Attorney, Agent, or Firm*—James W. Miller

(57) ABSTRACT

A cylindrical column of light is formed by the reflection of a laser light plane radially emitted by a main laser light plane source at the inner, mirrored surface of a 45° projector cone. A conical column can be generated and projected by intercepting and reflecting the cylindrical column of light using a diverting cone inside the 45° projector cone. The cylindrical or conical laser light column is set to have the same geometric characteristics of an intended attachment. When the column is properly projected on a surface, it will form an outline representing the desired pattern of intersection of a cylindrical or conical attachment with the surface. The column of light is provided by an illuminator assembly that carries the main laser light plane source, the projector cone, and the diverting cone. The illuminator assembly is carried on a portable support stand. The illuminator assembly has rotational adjustability about the xyz axes of an xyz coordinate system in addition to the lateral and vertical adjustability provided by portability and extendability of the support stand itself.

19 Claims, 20 Drawing Sheets

METHOD AND APPARATUS FOR INDICATING A PATTERN OF INTERSECTION USING A LIGHT COLUMN

CROSS REFERENCE TO RELATED APPLICATIONS

This application claims the benefit of one or more previously filed copending provisional applications identified as follows: Application Ser. No. 60/156,497 filed Sep. 28, 1999.

TECHNICAL FIELD

This invention relates to a method and portable apparatus for generating and projecting a column of light, either a cylindrical or conical column of laser light or the like with substantially uniform intensity, for shop and/or field layout or verification of two or three dimensional patterns of intersection of cylindrical and conical surfaces with any two-dimensional or three-dimensional objects of regular or irregular geometry, encountered in a variety of industrial applications, such as vessel, duct and pipe fitting construction or coping, or for verification of cylindrical and/or conical geometries.

BACKGROUND OF THE INVENTION

In many industrial applications, it is often necessary to join one component to another, such as joining one pipe to another, either perpendicularly or at a non-perpendicular angle relative to one another. Conically shaped components, such as nozzles, must often be joined to a pressure vessel or the like. In joining components in these and related applications, the pattern of intersection between the components must somehow be marked in order to let the receiving component be appropriately cut to allow the component to be joined to be attached to the receiving component. This is a difficult task given the many variables in the component shapes and other variables regarding the angle and direction in which they are to be joined together.

Existing layout, measurement, and projection laser instruments, such as that shown in U.S. Pat. No. 4,5.80,345 to Andrew, are not equipped to develop a true length full pattern projection, and are intended to mark a simple projection on a pipe surface for subsequent angular or beveled cutting. U.S. Pat. No. 5,860,220 to Gerd uses a rotary arm with a laser light source that must be rotated to mark cut lines. If one attempts to use existing conventional mechanical tools for measurement and drafting for this purpose, such tools have a number of functional and geometric limitations and further rely on the skill and dexterity of the technician. The commercial CAD software programs that are capable of generating a full-scale plot of intersection or transition geometry with unfolded pattern coordinates, to be transposed onto the work piece surface, are expensive, cumbersome, and time consuming to use. Alternatively, the common practice, currently employed by smaller manufacturers, is to resort to a limited selection of prefabricated intersection contour templates to be used for standard connections between components of certain cross-sectional dimensions. However, this latter practice is obviously limited as to the nature of the components that can be joined together as well as to the angle and direction in which they can be joined together.

SUMMARY OF THE INVENTION

The present invention provides an accurate, cost-effective and easy-to-use apparatus and method for integrated layout and verification of multiple shell intersection, transition and connection patterns. The apparatus and method covers a broad spectrum of fabricating shop and field operations for a variety of industries, such as process and utility equipment and piping fabrication, structural steel and sheet metal fabrication.

One aspect of this invention comprises a method for indicating a pattern of intersection between a receiving component and a component to be joined with the receiving component. The method comprises forming a column of light that represents physical characteristics of one of the components. The method further includes projecting the column of light so formed least partially onto a surface of the other component such that at least a portion of the pattern of intersection is represented on the surface of the other component by the outline of that portion of the light column which contacts the surface of the other component.

Another aspect of this invention relates to an apparatus for indicating a pattern of intersection between a receiving component and a component to be joined with the receiving component. The apparatus comprises an illuminator assembly for projecting a column of light that represents one of the components. A support stand adjustably carries the illuminator assembly to allow the column of light projected by the illuminator assembly to be projected onto the other component at a desired spot and in a desired direction, whereby the intersection pattern is represented by the outline of the column of light on a surface of the other component.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

The apparatus of this invention comprises, in general terms, an illuminator assembly, indicated generally as 48, secured to or carried by a support stand, indicated generally as 50. Illuminator assembly 48 projects a column of laser light or the like, either a cylindrical or a conical column, against a planar or non-planar surface. Support stand 50 adjustably positions illuminator assembly 48 in three-dimensional space to permit wide variation in the location and direction of the light column projected by illuminator assembly 48. Support stand 50 is portable to allow illuminator assembly 48 to be moved from site to site and to be positioned adjacent the surface against which the column of light is to be projected.

The Illuminator Assembly

Figure 11:
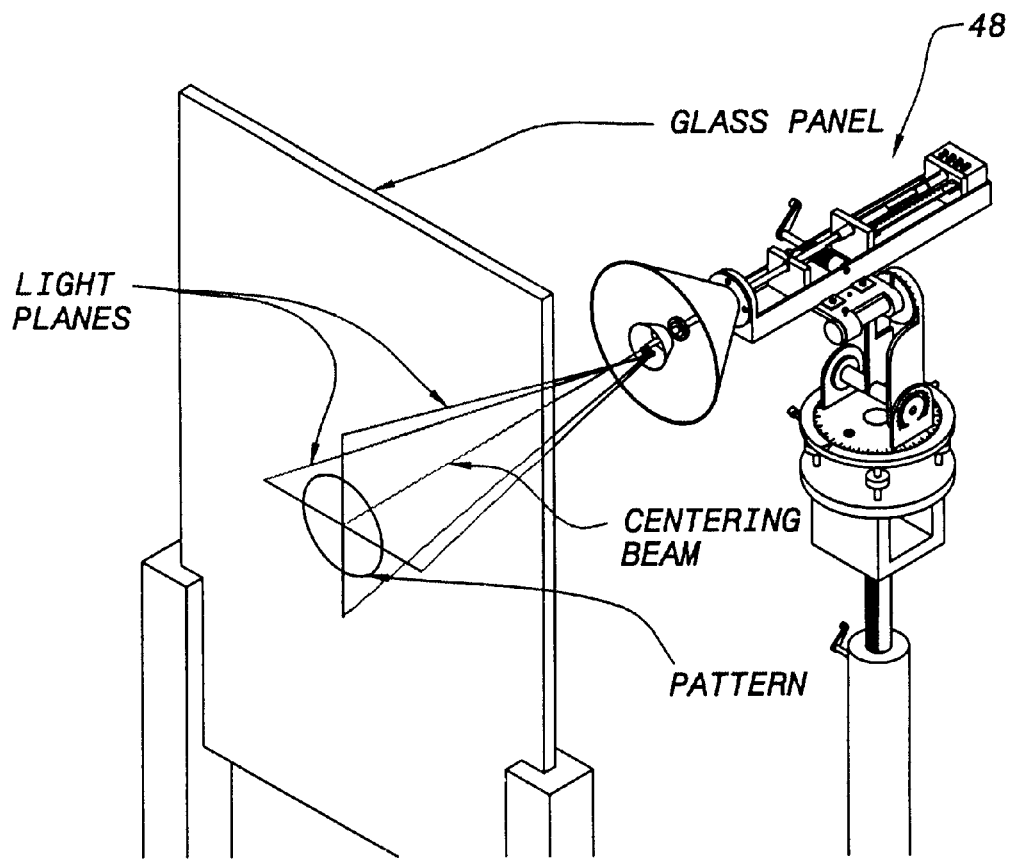
FIG. 11 is a perspective view of the apparatus shown in FIG. 1 in operation in the method of this invention, particularly illustrating the apparatus being used to project a cylindrical column of light onto the side of a planar surface and further illustrating the use of both the centering beam and the two additional laser light surfaces used to project orthogonal reference planes.
Figure 12:
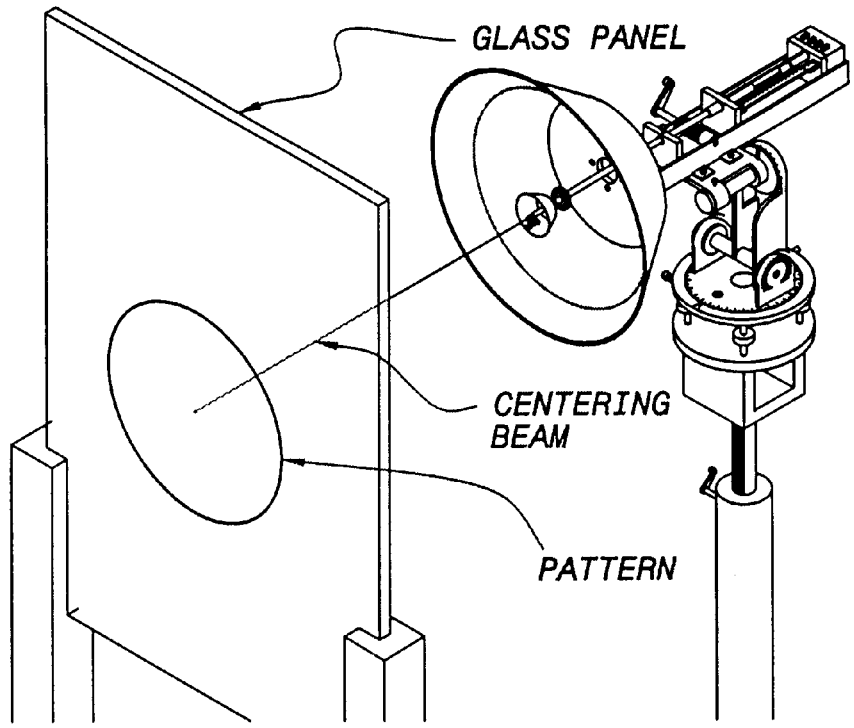
FIG. 12 is a perspective view of the apparatus shown in FIG. 1 in operation in the method of this invention, particularly illustrating the apparatus being used to project a cylindrical column of light onto the side of a planar surface and further illustrating the use of the centering beam only.

Illuminator assembly 48 is provided with a removable, flange-mounted, mirrored inner surface, 45° projector cone 9. Projector cone 9 has a mounting flange 52 which removably attaches projector cone 9 to an illuminator assembly housing 5A. Thus, different sized cones 9 can be installed on illuminator assembly housing SA as selected by the user by unbolting mounting flange 52 of one cone 9 and by bolting mounting flange 52 of a differently sized cone 9 to illuminator assembly housing 5A. The purpose of this is to allow a projector cone 9 of sufficient size to be installed that is capable of projecting a column of light within a desired range of working diameters. See FIGS. 11 and 12 which show differently sized projector cones 9 attached to illuminator assembly housing 5A.

A given projector cone 9 when used on illuminator assembly housing 5A covers successive increments of a particular working diameter range. A sliding illuminator shaft 1A is carried on illuminator assembly housing 5A and is equipped with a main-laser light plane source 2. Laser light plane source 2 is capable of radially emitting a full 360° laser light plane strictly perpendicular to the axis of illuminator shaft 1A. This radial plane of laser light emitted by laser light plane source 2 will engage and be reflected by the mirrored inner surface of projector cone 9 into a cylindrical light column.

Figure 13:
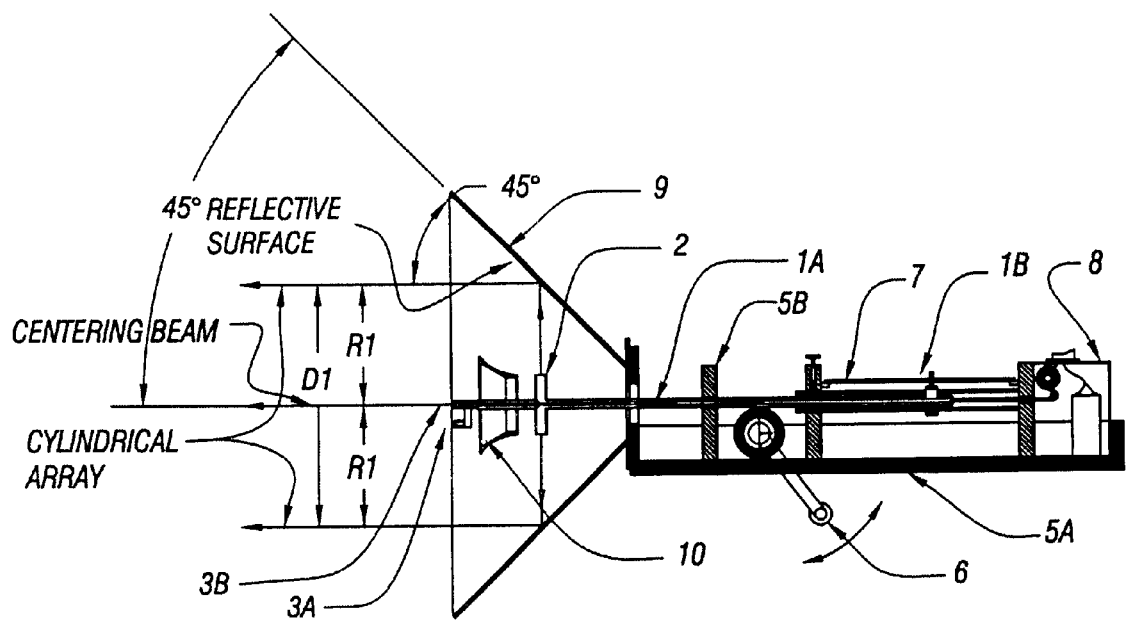
FIG. 13 is a side elevational view of the illuminator assembly of the apparatus shown in FIG. 1 in operation in the method of this invention, particularly illustrating the illuminator assembly being used to project a cylindrical column having a first diameter.
Figure 14:
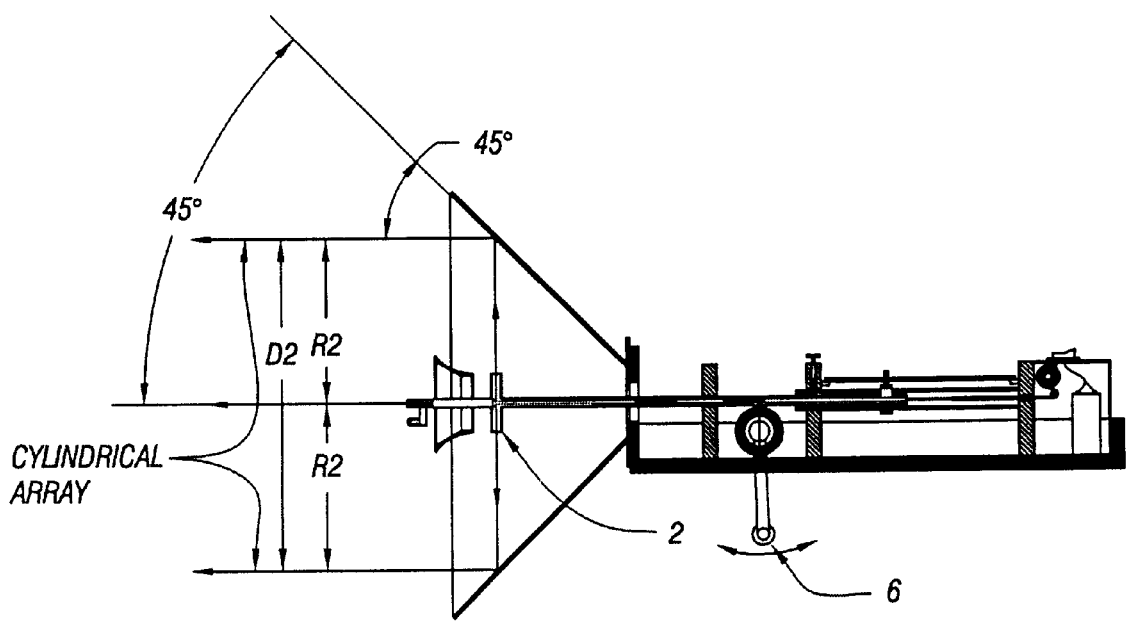
FIG. 14 is a side elevational view, similar to FIG. 13, of the illuminator assembly of the apparatus shown in FIG. 1 in operation in the method of this invention, particularly illustrating the illuminator assembly being used to project a cylindrical column having a second diameter that is larger than the first diameter shown in FIG. 13.

Illuminator shaft 1A slides inside a slotted stationary sleeve 4 on illuminator assembly housing 5A. Illuminator shaft 1A is equipped with a linear scale indicator 1B traveling- within the slot of stationary sleeve 4. sliding illuminator shaft 1A back and forth within stationary sleeve 4 moves laser light plane source 2 back and forth within projector cone 9 to vary the diameter of the cylindrical light column projected by projector cone 9. See FIGS. 13 and 14. Indicator 1B cooperates with a linear scale 7 located on illuminator assembly housing 5A to help the user select a desired diameter of the projected cylindrical light column. Once a desired reading on linear scale 7 is obtained, the position of sliding illuminator shaft 1A relative to stationary sleeve 4 can be secured or locked by a set screw 54 that extends into one of two sliding shaft support lugs 5B,5C located on illuminator assembly 48 housing.

Figure 1:
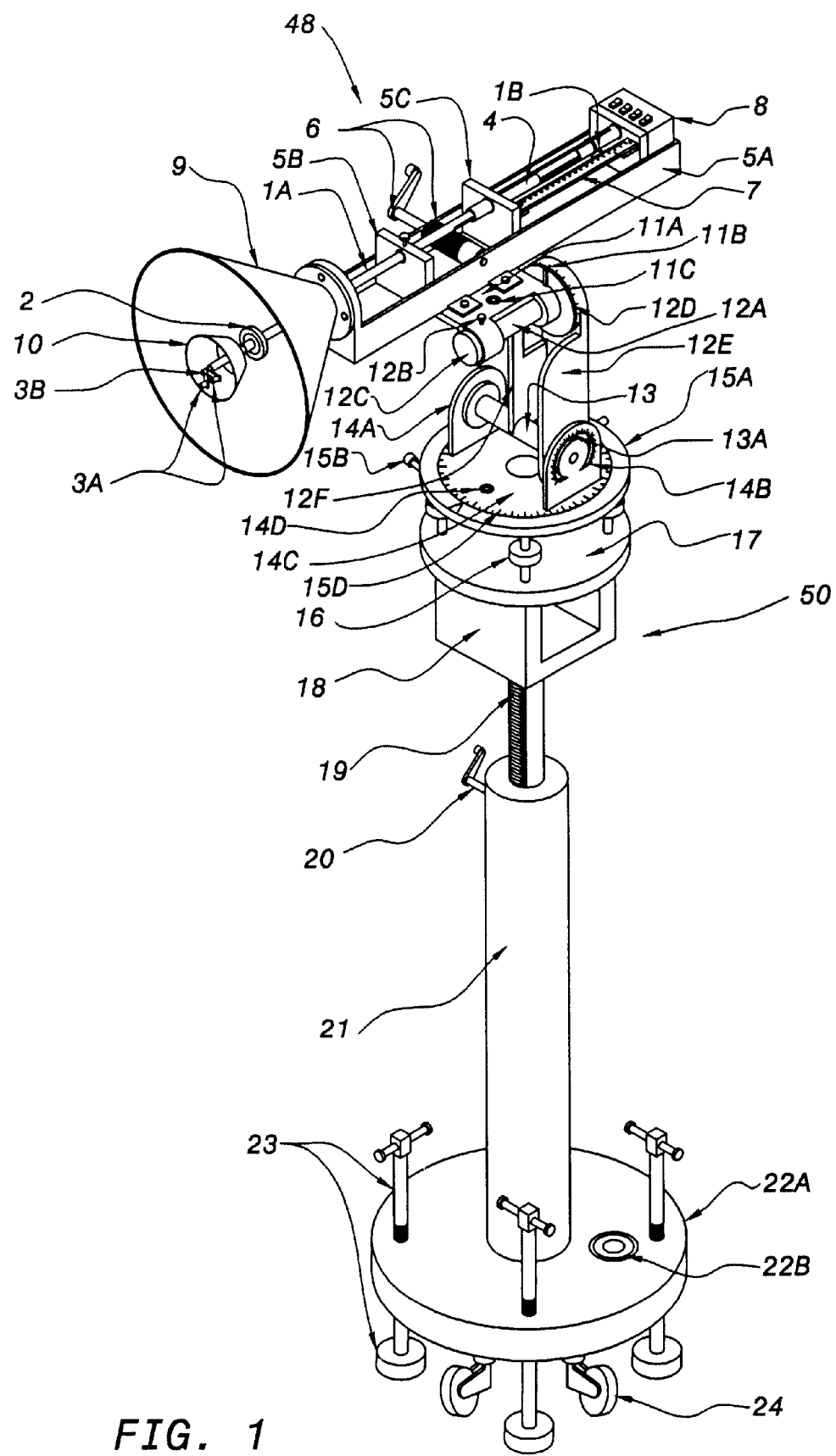
FIG. 1 is a perspective view of an apparatus according to this invention.
Figure 2:
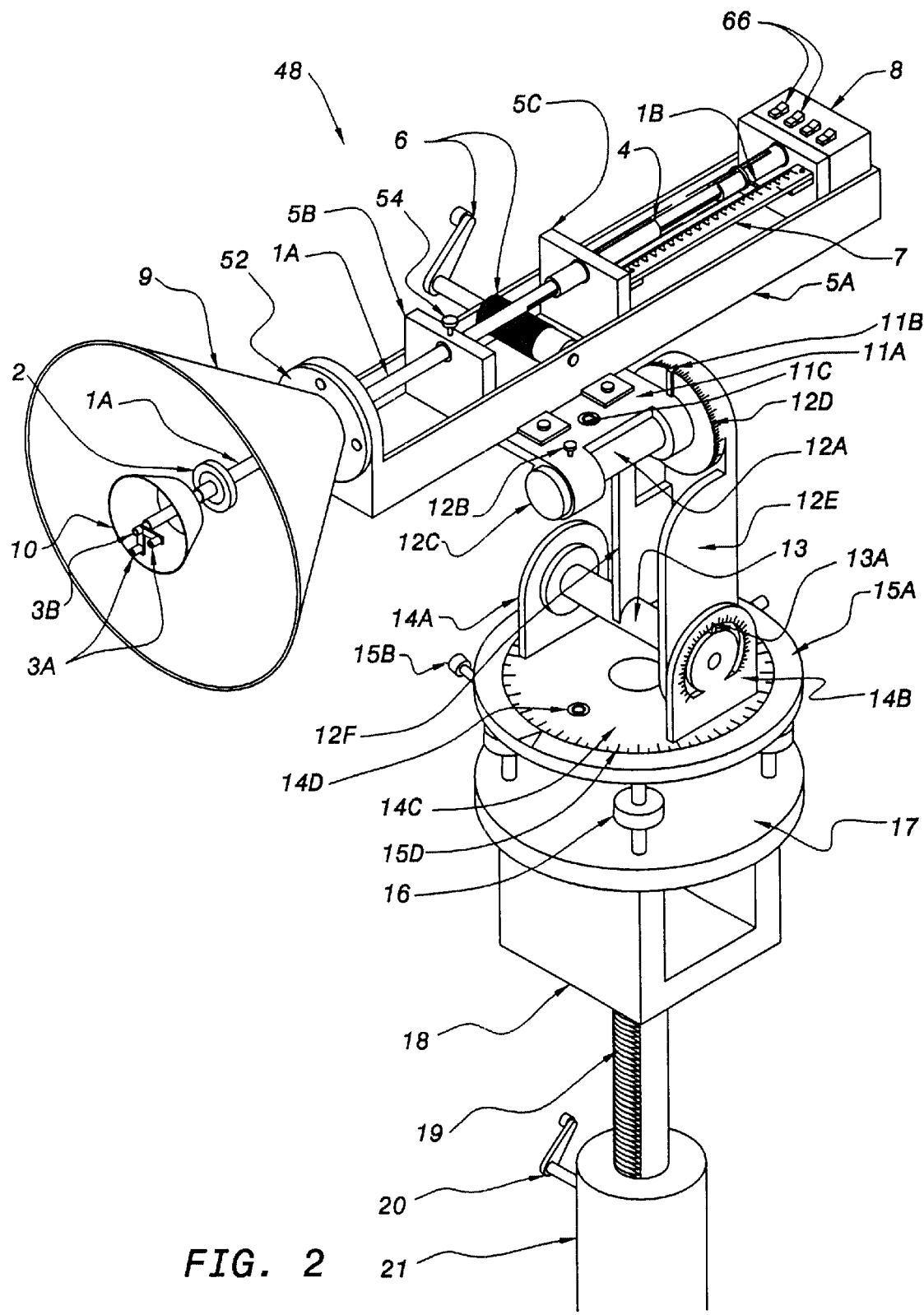
FIG. 2 is an enlarged perspective view of a portion of the apparatus shown in FIG. 1.
Figure 3:
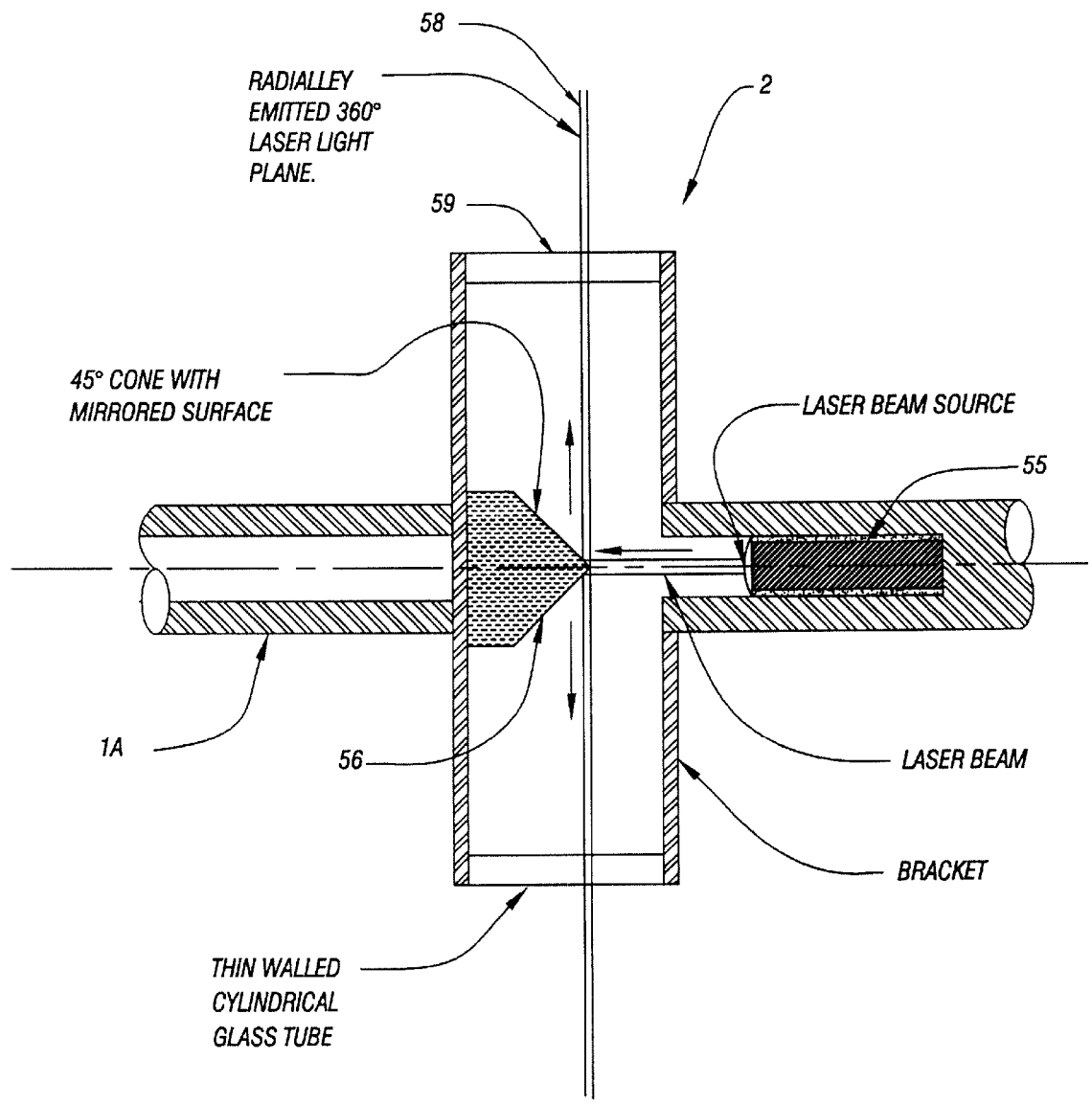
FIG. 3 is a diagrammatic view of the operation of a portion of the apparatus shown in FIG. 1, namely of the operation of the laser light plane source.

The operation of laser light plane source 2 is depicted in FIG. 3. A laser beam source 55 located along the axis of illuminator shaft 1A projects a laser beam against the apex of a conical mirrored surface 56. This converts the laser beam into a thin plane 58 of laser light that is projected radially outwardly through a cylindrical glass tube 59 forming the housing of laser light plane source 2. The plane 58 of laser light extends around a full 360° circumference. Laser light plane source 2 is well known in the laser art for emitting laser light in a plane radial to the axis of the source, and any suitable laser light plane source 2 known in the art could be mounted on illuminator shaft 1A and used for the purposes of this invention.

The end of illuminator shaft 1A has an additional central laser pointer 3B. The end of illuminator shaft 1A is also equipped with two additional laser light sources 3A, emitting and diverging laser light through two cylindrical surface lenses into mutually perpendicular laser light planes. See FIG. 11 which illustrates the centering beam provided by laser pointer 3B and the mutually perpendicular planes emitted by laser light sources 3A. The 90° angle between the laser light planes provided by laser light sources 3A is maintained by virtue of the rigid mounting of laser light sources 3A to the end of illuminator shaft 1A.

A set of replaceable light diverting cones 10, each with a mirrored outer surface, is also provided. One such light diverting cone 10 is mounted on illuminator shaft 1A inside projector cone 9. Within the Bet of cones 10, light diverting cones 10 come in different reflective surface angles, at 5° cone angle increments or at any specific desired angle. The user selects one such light diverting cone 10 from the set thereof and mounts this cone 10 on illuminator shaft 1A in advance of laser light plane source 2.

As noted earlier, light plane 58, generated by laser light plane source 2 perpendicular to the axis of illuminator shaft 1A, strikes or is bounded by the circumference of the inner, mirrored surface of projector cone 9. This reflects the circular boundary of light plane 58 into a cylindrical column of light that is parallel to illuminator shaft 1A and to the axis of projector cone 9. The axial position of sliding illuminator shaft 1A with respect to projector cone 9 defines the diameter of the resulting projected cylindrical column of light. This diameter can be easily changed by the user or operator by displacing illuminator shaft 1A inside, and along the axis of, projector cone 9 using a hand-driven worm gear adjusting mechanism 6 or any other suitable linear motion mechanism. The resulting projection diameter of the cylindrical light column can be read from linear scale 7 on illuminator assembly housing 5A.

In using illuminator assembly 48, illuminator shaft 1A is adjusted so that the diameter of the resulting cylindrical column of light is set to some desired value. Typically, the diameter is set to be equal to that of a component, such as a vessel nozzle or a round shell attachment or a pipe, for the purpose of preparing or marking a receiving surface, i.e. a surface to which the component is to be joined such that the surface subsequently receives the component. For example, assume that a circular pipe having a 5 inch diameter is to be joined to another pipe having a 10 inch diameter. In this case, illuminator shaft 1A is positioned to provide a cylindrical column of light having a 5 inch diameter, i.e. a diameter that is equal to that of the component, i.e. the 5 inch pipe, that is to be received in or joined to the 10 inch pipe.

Figure 10:
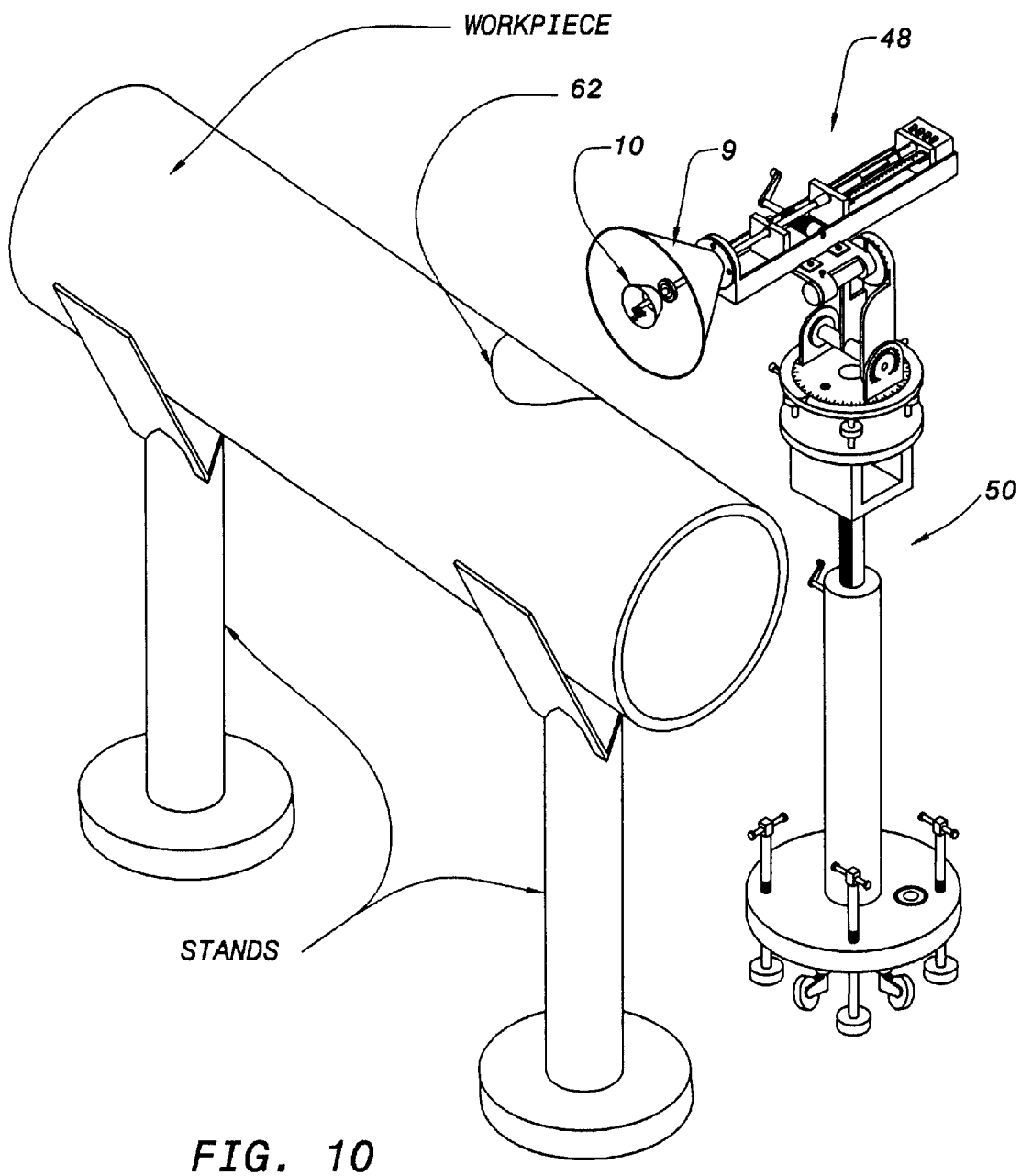
FIG. 10 is a perspective view of the apparatus shown in FIG. 1 in operation in the method of this invention, particularly illustrating the apparatus being used to project a cylindrical column of light onto the side of a pipe.

Referring now to FIG. 10, after illuminator assembly 48 is adjusted to provide a cylindrical column of light having the correct diameter, i.e. in the example above a 5 inch diameter equal to the diameter of the 5 inch pipe that is to be joined to the 10 inch pipe, illuminator assembly 48 can then be positioned adjacent the receiving surface, i.e. adjacent the 10 inch pipe. In setting the diameter of the column of light, such diameter can be set to be either precisely equal to the pipe diameter, or approximately equal to the diameter of the 5 inch pipe since it might be desirable to have the diameter of the column of light either slightly more or slightly less than the exact diameter of the pipe to accommodate the type of weld that might be used to join the 5 inch pipe to the 10 inch pipe. Through suitable adjustment of support stand 50, illuminator assembly 48 is directed at the receiving surface in a desired direction.

In the case of the example shown in FIG. 10, illuminator assembly 48 is directed perpendicularly towards one side of the 10 inch pipe.

After illuminator assembly 48 is properly positioned, the projection of the cylindrical column of light by illuminator assembly 48, captured by the receiving surface represented by the side of the pipe, will visually represent the intersection pattern formed on the joining pieces by their connection. In other words, again referring to FIG. 10, the cylindrical column of light will have an outline 62 when it strikes the receiving surface which will exactly represent the required intersection pattern that must be cut into the receiving surface in order to receive the component. Again, in the case of the example shown in FIG. 10, outline 62 will represent the intersection pattern required for the 5 inch pipe to be received in the 10 inch pipe in order to join the 5 inch pipe to the 10 inch pipe in the desired manner. This outline 62 can be traced or marked in any suitable manner, and the intersection pattern can subsequently be cut by a cutting implement following the marked outline 62, to create an opening suitable for receiving the 5 inch pipe.

In adjusting and pointing illuminator assembly 48 at the receiving surface, the center of the pattern is defined by the centering beam emitted by laser pointer 3B located at the end of illuminator shaft 1A. For example, the beam from laser pointer 3B can be directed at the center of the pattern in accordance with the connection pattern coordinates suggested by the work piece construction documents. Similarly, the perpendicular light planes emitted from laser light sources 3A can also help center and locate illuminator assembly 48 so that it is directed at an appropriate angle at the receiving surface.

Obviously, the use of laser pointer 3B, and/or the light planes provided by laser light sources 3A, are useful, but not strictly necessary to the operation of the invention. Other ways of centering and aligning illuminator assembly 48 so that the cylindrical column of light strikes the receiving surface at the right spot and in the right direction could be used.

Figures 27, 28:
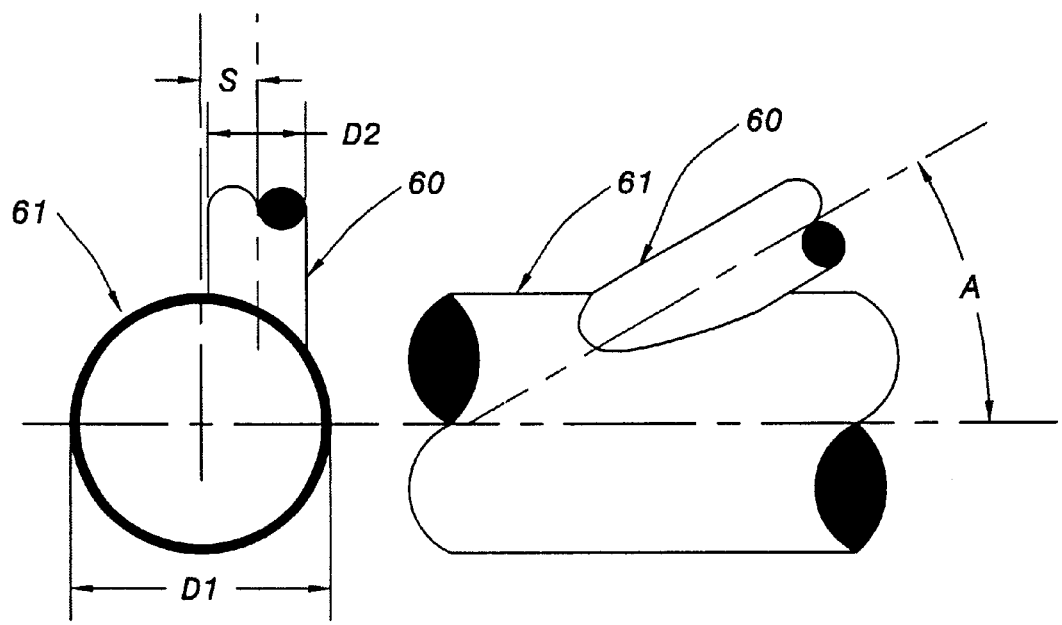
FIG. 27 is a side elevational view of an application for which the apparatus and method of this invention are suited, namely two pipes joined together.
FIG. 28 is a cross-sectional view what is shown in FIG. 27, namely a cross-sectional view of two pipes joined together.

While FIG. 10 illustrates an orientation in which illuminator assembly 48 projects a cylindrical light column to form an intersection pattern of two pipes connected perpendicularly relative to one another, illuminator assembly 48 can obviously be adjusted for non-perpendicular attachments as well. For example, FIGS. 27 and 28 illustrate the joining of a small pipe 60 to a large pipe 61 at an angle and off-center on the large pipe. Again, illuminator assembly 48 would be positioned to shine a cylindrical column of light on the large pipe 61, equal in diameter to the diameter of the small pipe 60, at the location where the small pipe 60 is to connect to the large pipe 61 and at the angle the small pipe 60 is to make with the large pipe 61. When this is done, the intersection pattern will be visually displayed on the large pipe 61 to allow this intersection pattern to be marked and cut.

Figure 19:
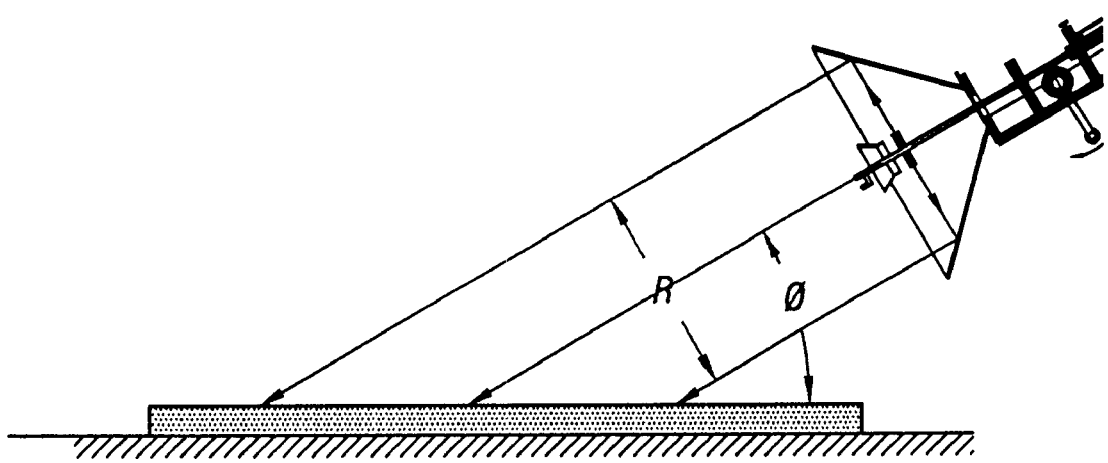
FIG. 19 is a side elevational view of the illuminator assembly of the apparatus shown in FIG. 1 in operation in the method of this invention, particularly illustrating the illuminator assembly being used to project a cylindrical column of light against a planar surface to form an intersection pattern.
Figure 20:
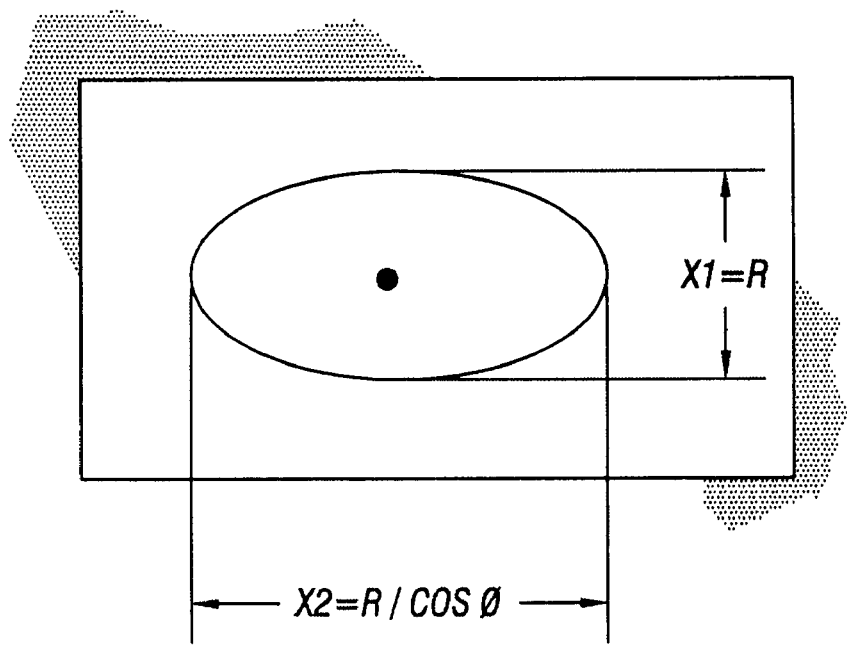
FIG. 20 is a top plan view of the intersection pattern formed by the illuminator assembly in FIG. 19, the specific pattern being an ellipse.

Moreover, illuminator assembly 48 can also be used to show an intersection pattern on a planar or two-dimensional surface, as opposed to a three-dimensional surface such as a pipe. See FIGS. 11 and 12 which show an intersection pattern projected at a perpendicular angle onto a planar surface, and FIGS. 19 and 20 which show a non-perpendicular projection onto a planar surface.

Figure 15:
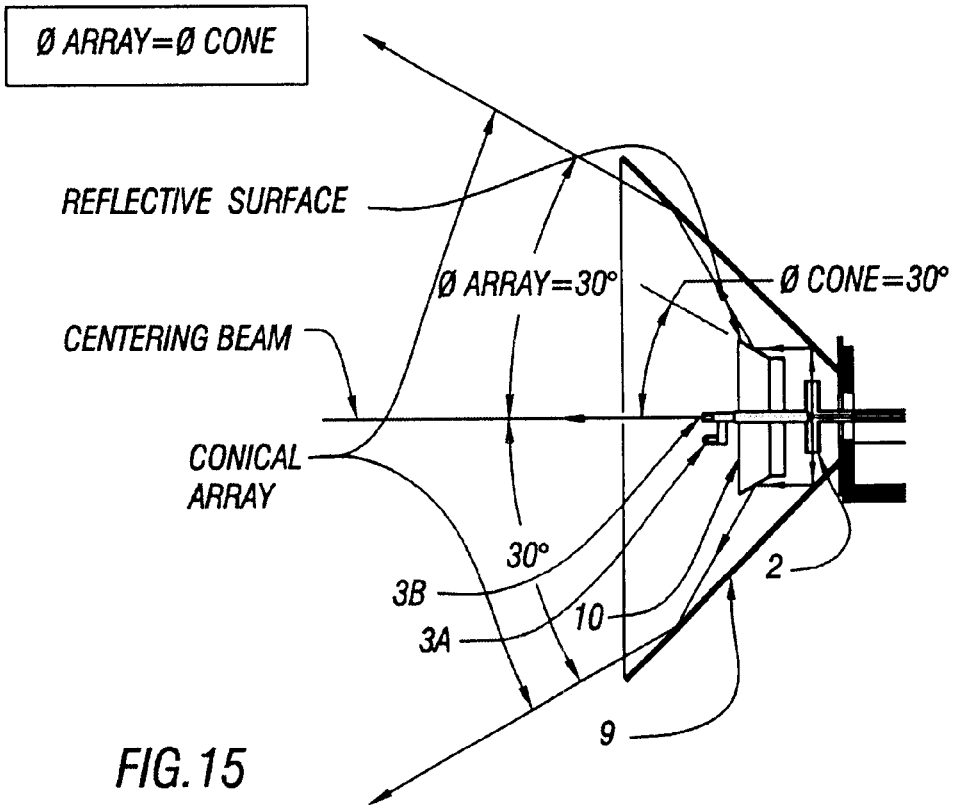
FIG. 15 is a side elevational view of the illuminator assembly of the apparatus shown in FIG. 1 in operation in the method of this invention, particularly illustrating the illuminator assembly being used to project a conical column having a first cone angle.
Figure 16:
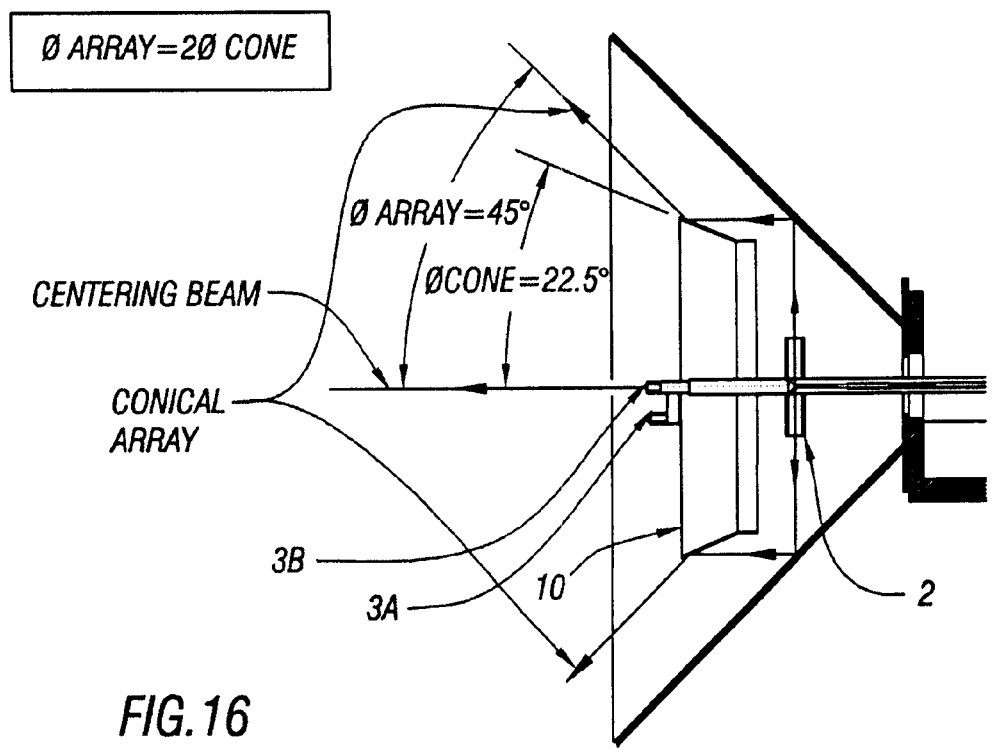
FIG. 16 is a side elevational view, similar to FIG. 15, of the illuminator assembly of the apparatus shown in FIG. 1 in operation in the method of this invention, particularly illustrating the illuminator assembly being used to project a conical column having a second cone angle that is smaller than the first cone angle shown in FIG. 15.

The replaceable diverting cones 10, one of which is attached to illuminator shaft 1A, can be used for generating a conically shaped light column by deflecting the cylindrical light column using the outer reflective surface of diverting cone 10 attached to illuminator shaft 1A. This is illustrated in FIGS. 15 and 16. Conical light columns with a central angle up to and exceeding 90° can be projected by illuminator assembly 48. The geometry of the conical light column, defined by the cone surface angle at the point of reflection, is determined in accordance with the required geometry of the construction and the distance between the apparatus and the pattern projection on the surface of the receiving shell or work piece, with the help of geometric reference tables, provided by the apparatus supplier. The replaceable diverting cone 10, located at the front end of illuminator shaft 1A, is compact and requires the operator to place diverting cone 10 the near the back end of projector cone 9 when working with conical nozzles or shell intersections. As with the aforementioned cylindrical laser light column, the beam, emitted by the central laser pointer 3B at the end of illuminator shaft 1A, provides a centering function.

A conically shaped column of light can be projected against a receiving surface to represent the intersection pattern of a conically shaped object with that surface. For example, a conically shaped column of light would be used if a conical nozzle were to be attached to the surface of a pressure vessel. Again, as in the case of the cylindrical column of light, the purpose of projecting a conical column of light onto a surface is to directly represent the intersection pattern between the surface and the component that is to be joined to that surface. This allows the intersection pattern to be marked for subsequent cutting of the pattern and assembly of the component to the surface or simply for verification purposes. Verification would be simply a projection of the column of light onto a surface to observe the pattern and to verify that the intersection pattern corresponds to a desired pattern and does not spatially extend into areas where it should not.

In addition, another use for the cylindrical and conical columns of light projected by illuminator assembly 48 is for the verification of cylindrical and conical geometries of various components or structures. For example, one could project a cylindrical column of light of a predetermined diameter to ensure that a particular cylindrical member or object was sized to be entirely received within this column of light, and was not deformed such that portions of the member or object extended outside the column of light. Similarly, the conical columns of light could be used to check and verify the geometry of conically shaped objects.

Figures 29, 30:
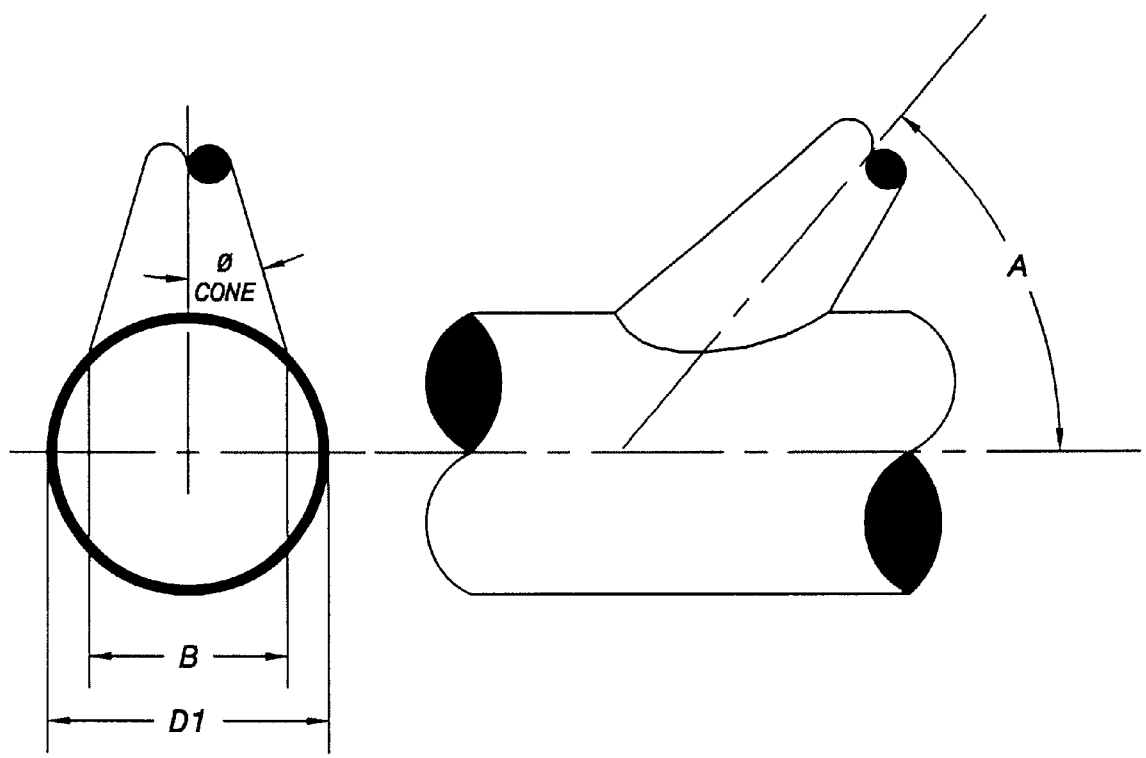
FIG. 29 is a side elevational view of another application for which the apparatus and method of this invention are suited, namely joining a conical shell and a pipe being joined together.
FIG. 30 is a cross-sectional view what is shown in FIG. 29, namely a cross-sectional view of the conical shell and pipe joined together.

FIGS. 29 and 30 illustrate the connection of a conical shell to a pipe. This is an application where illuminator assembly 48 would be used to project a conical column of light against the pipe to visually represent the intersection pattern. The cone angle used in this column of light would be equal to the angle of the conical shell.

Figure 17:
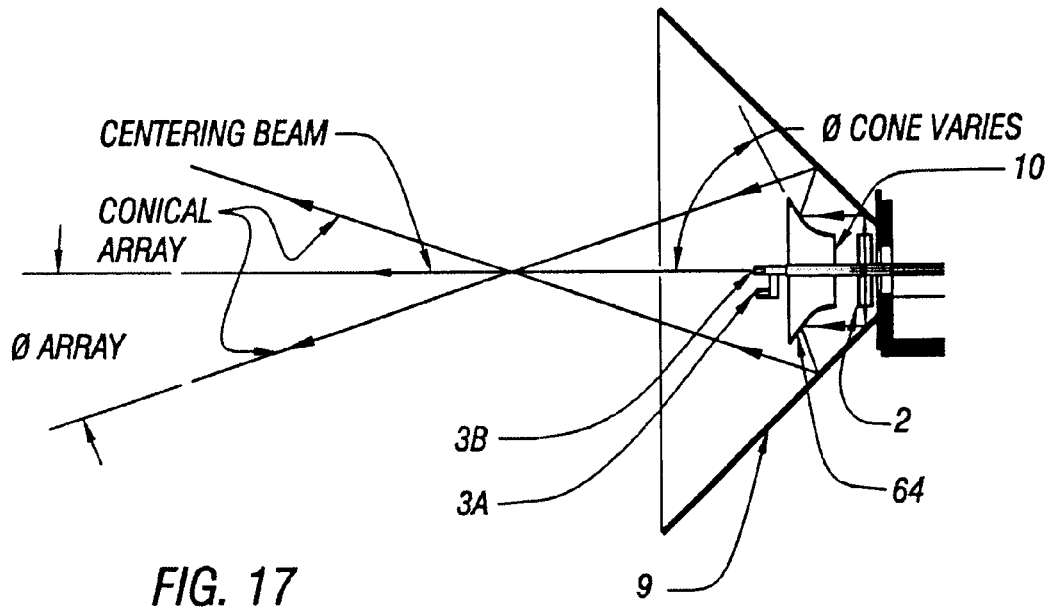
FIG. 17 is a side elevational view of the illuminator assembly of the apparatus shown in FIG. 1 in operation in the method of this invention, particularly illustrating the illuminator assembly being used to project a conical column having a first cone angle and illustrating an alternative embodiment using a single slidable diverting cone on the illuminator shaft.
Figure 18:
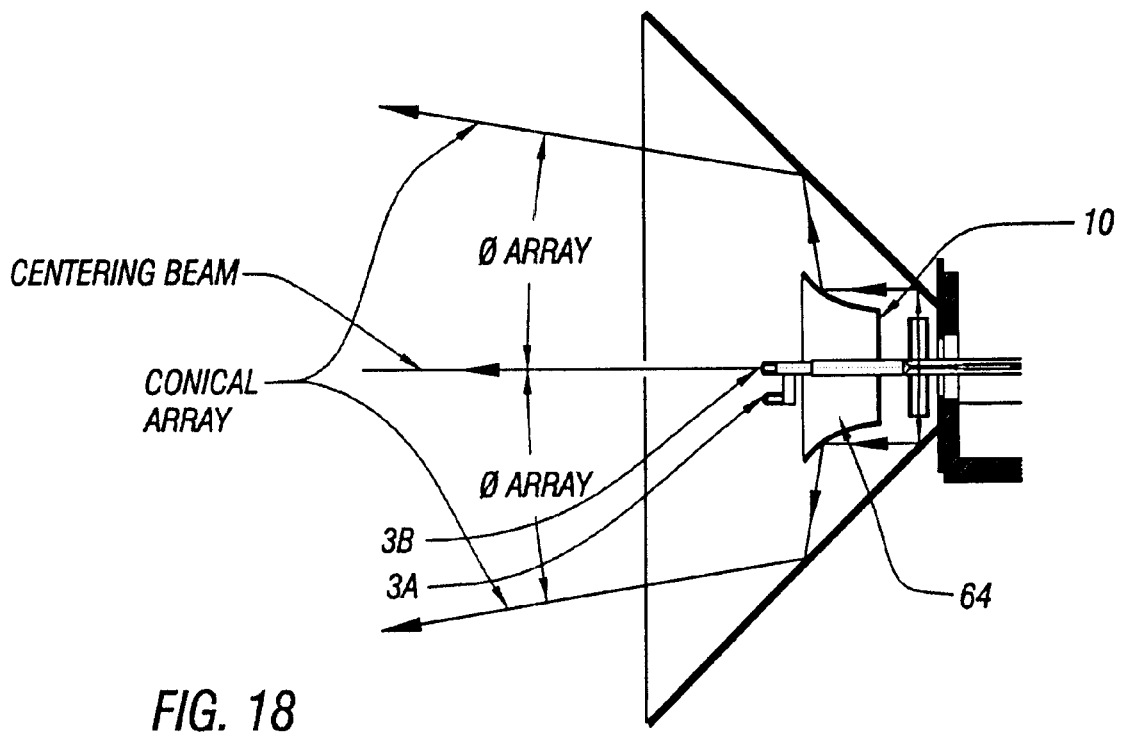
FIG. 18 is a side elevational view of the illuminator assembly of the apparatus shown in FIG. 1 in operation in the method of this invention, particularly illustrating the illuminator assembly being used to project a conical column having a second cone angle that is smaller than the first cone angle shown in FIG. 17 and illustrating an alternative embodiment using a single slidable diverting cone on the illuminator shaft.

Referring now to FIGS. 17 and 18, instead of using a set of replaceable light diverting cones 10 to adjust and select the cone angle of the conical column of light, it would be possible to use a diverting cone, having a bellshaped outer surface 64 known as a hyperboloid, that would move towards and away from laser light plane source 2 on illuminator shaft 1A. By adjusting the distance between such a diverting cone and laser light plane source 2, one can select where the reflected cylindrical light column would engage the bell-shaped outer surface 64 of diverting cone to select a particular cone angle.

Illuminator assembly 48 includes various switches 66 that can alternatively activate the various laser light sources carried on illuminator assembly 48, i.e. main laser plane source 2, laser pointer 3B, and/or either or both of laser light sources 3A. Switches 66 are connected to a power supply (not shown) and are located in power box 8 at the back end of illuminator assembly housing 5A. The power supply can be of any suitable type, and preferably includes a battery power supply that is self-contained within power box 8. However, other power supplies, including external power supplies such as an external source of electrical power, could also be used.

The Support Stand

Turning now to support stand 50 which is used to orient illuminator assembly 48, support stand 50 includes an upper holding bracket 11A for illuminator assembly 48. Illuminator assembly housing 5A is rigidly attached to holding bracket 5A by mounting screws or bolts 68. Holding bracket 11A can be rotated in two vertical planes, parallel and perpendicular to the axis of illuminator shaft 1A, about two horizontal pins 12A and 13 that hinge in various supporting lugs. The upper horizontal pin 12A provides rotational freedom or capability for the mutually perpendicular laser light planes emitted by laser light sources 3A at the end of illuminator shaft 1A. The supporting lugs 12E,12F for upper horizontal pin 12A are rigidly mounted to lower horizontal pin 13 that provides rotational freedom or capability for the beam provided by laser pointer 3B as well as for the column of light provided by illuminator assembly 48 itself.

The supporting lugs 14A of lower horizontal pin 13 are mounted on a turntable consisting of an upper plate 14C and a lower plate 15A. Upper plate 14C carries supporting lugs 14A for lower horizontal pin 13. Upper plate 14C is rotatable on top of lower plate 15A. Lower plate 15A is, in turn, supported by three or four leveling screws 16 on top of a vertically telescoping shaft assembly 19. Each leveling screw 16 has a spindle-in-a-socket connection with a shaft assembly bearing cap plate 17 that is fixed to the top of a U-shaped bracket 18 carried on telescoping shaft assembly 19. Upper and lower plates 14C and 15A are connected via an inner and outer spindle and socket similar to the basic construction components of a transit such that upper plate 14C can rotate back and forth on lower plate 15A.

Set screws 15B are provided at the socket and below lower plate 15A to lock upper plate 14C at a desired angle in the horizontal plane. Two protractor scales 12D and 14B, each encompassing a minimum of 135°, are provided at the joints of horizontal pins 12A and 13 for taking readings of the angle of inclination in the two vertical planes that are parallel and perpendicular to the axis of illuminator shaft 1A. The readings of the angles of vertical rotation are obtained with the help of indicators 11B and 13A attached to holding bracket 11A and lower horizontal pin 13, respectively. In addition, the supporting outer flange of lower plate 15A of the turntable is provided with a pointer that can be read against a protractor scale 15D carried on upper plate 14C for measuring the horizontal angle of rotation of illuminator assembly 48 about the vertical axis of telescoping shaft assembly 19.

Figure 4:
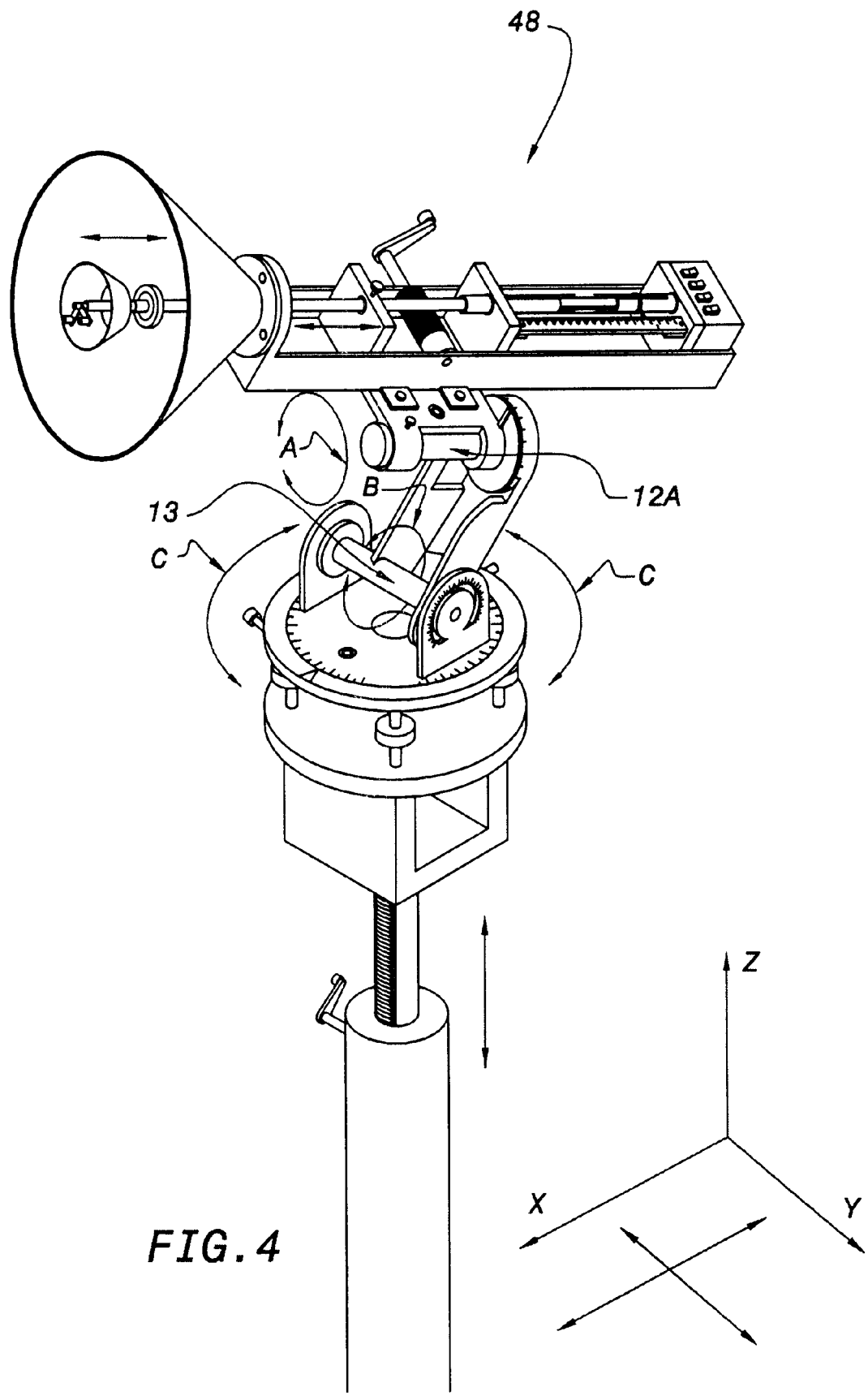
FIG. 4 is an enlarged perspective view of a portion of the apparatus shown in FIG. 1, particularly illustrating various positional adjustments that can be made thereto.
Figure 5:
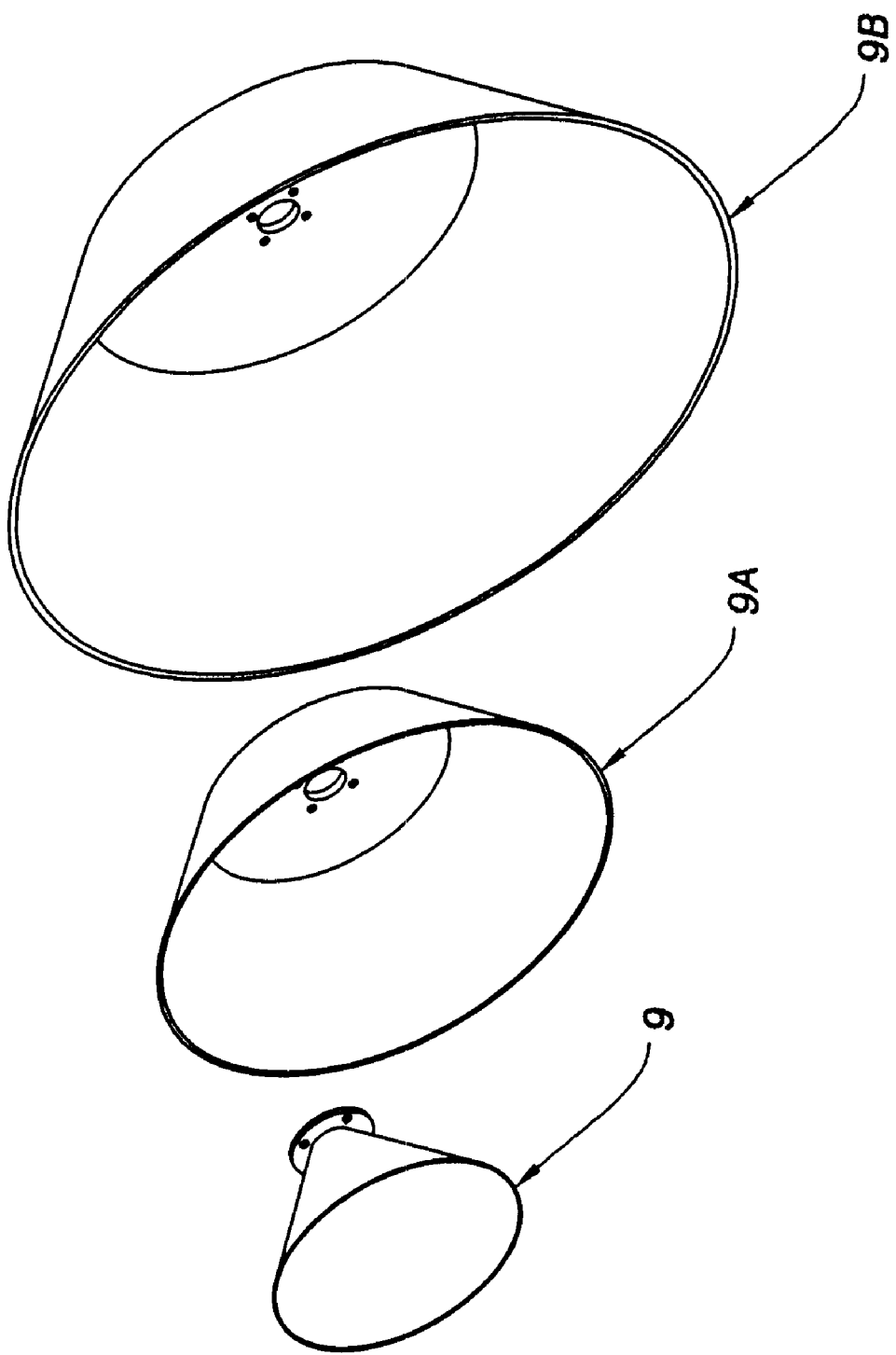
FIG. 5 is a perspective view of a set of projector cones of different sizes representing different working diameter ranges used in the apparatus of FIG. 1.
Figure 6:
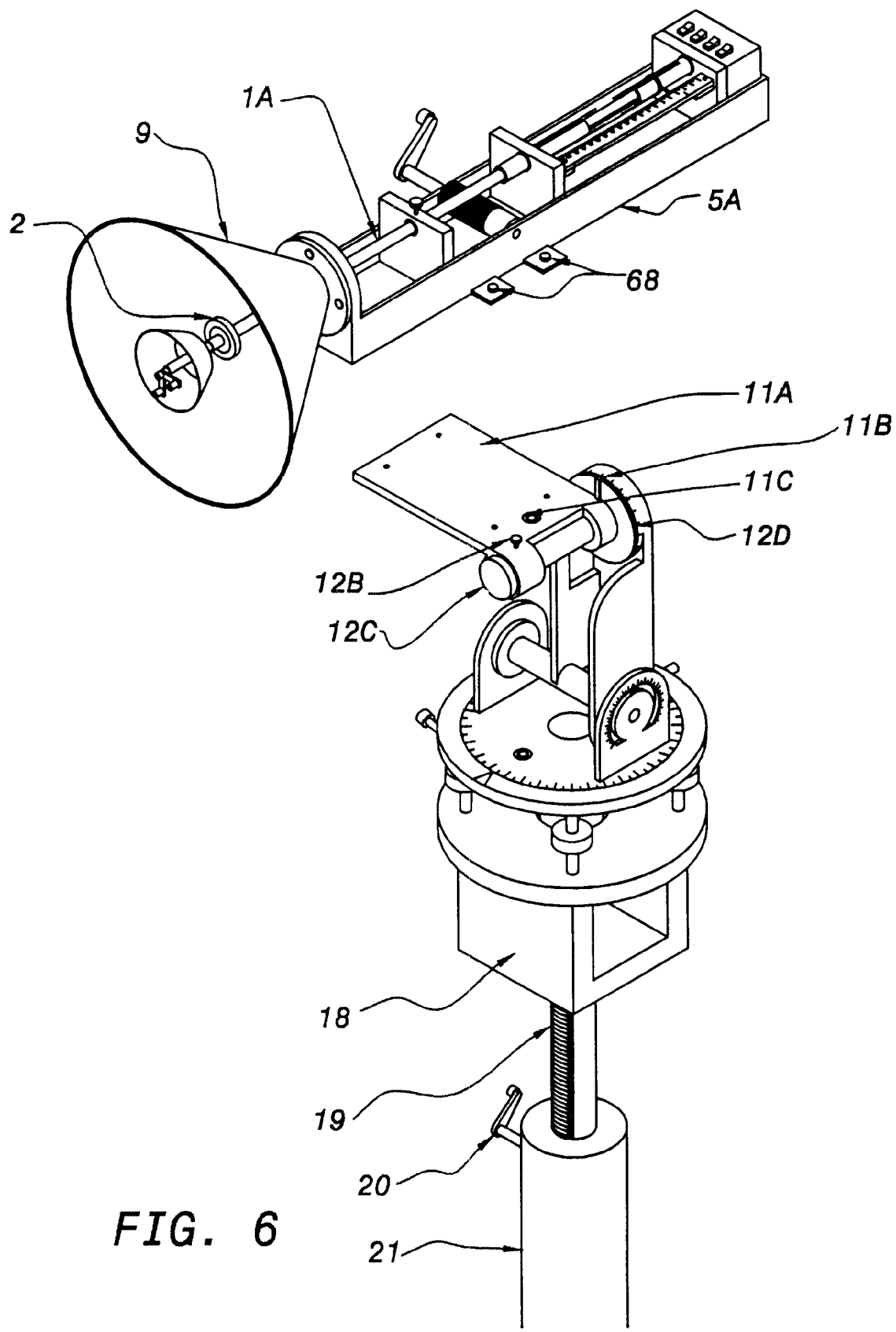
FIG. 6 is an enlarged perspective view. of a portion of the apparatus shown in FIG. 1, particularly illustrating the illuminator assembly disconnected from its support stand.
Figure 7:
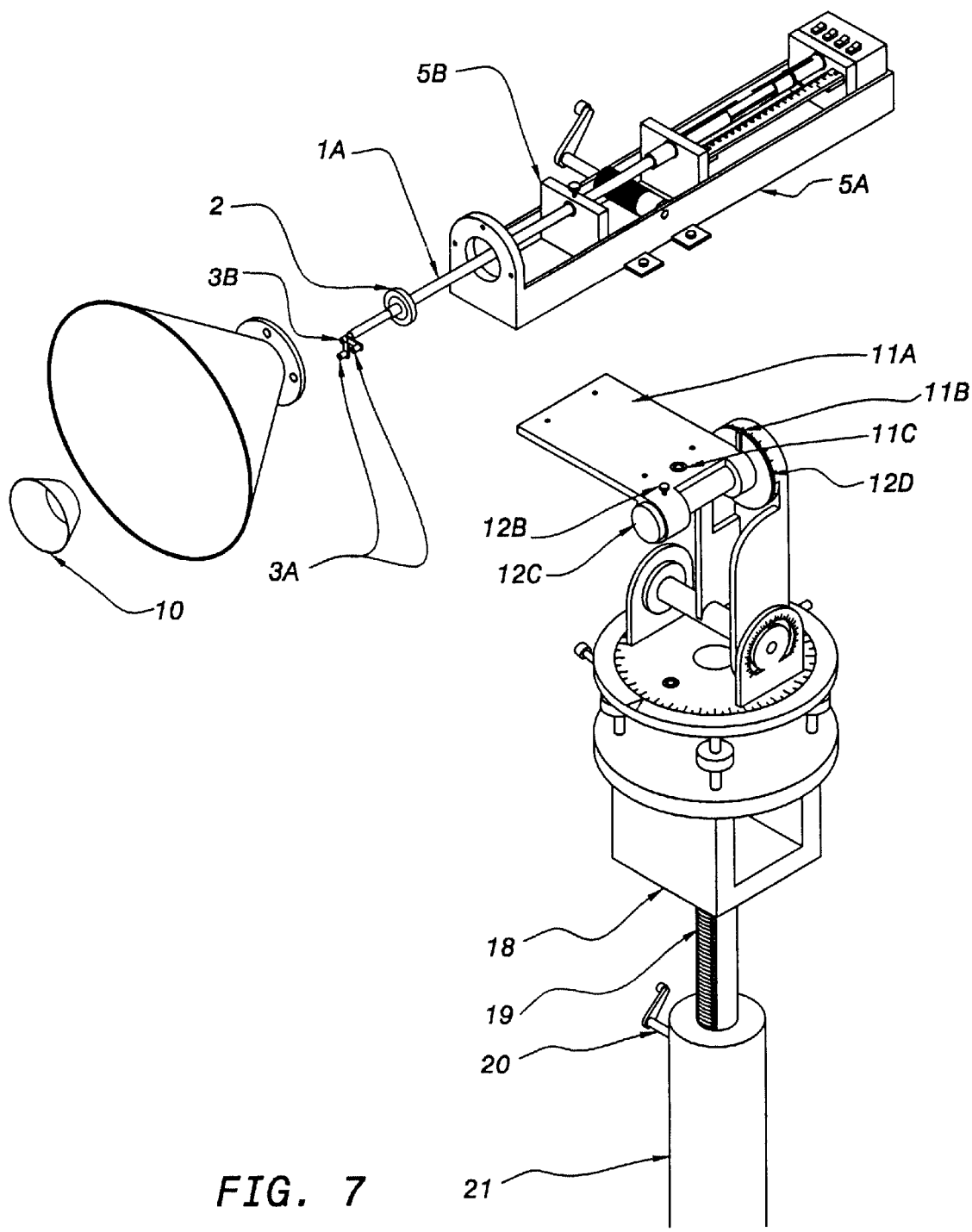
FIG. 7 is an enlarged perspective view, similar to FIG. 6, of a portion of the apparatus shown in FIG. 1, particularly illustrating the illuminator assembly disconnected from its support stand and showing some of the components of the illuminator assembly in exploded form.
Figure 8:
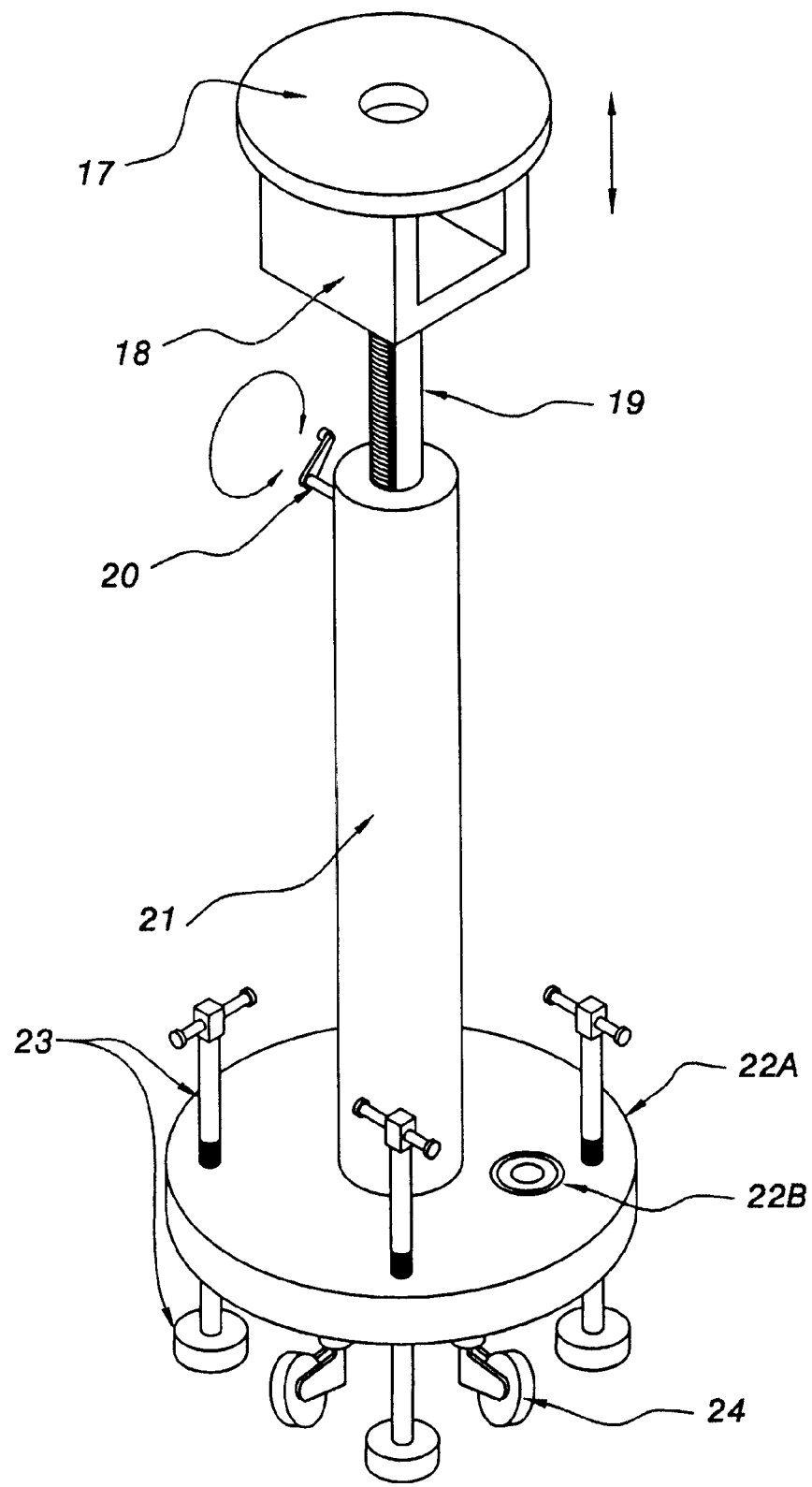
FIG. 8 is an enlarged perspective view of a portion of the apparatus shown in FIG. 1, particularly illustrating the base of. the support stand.
Figure 9:
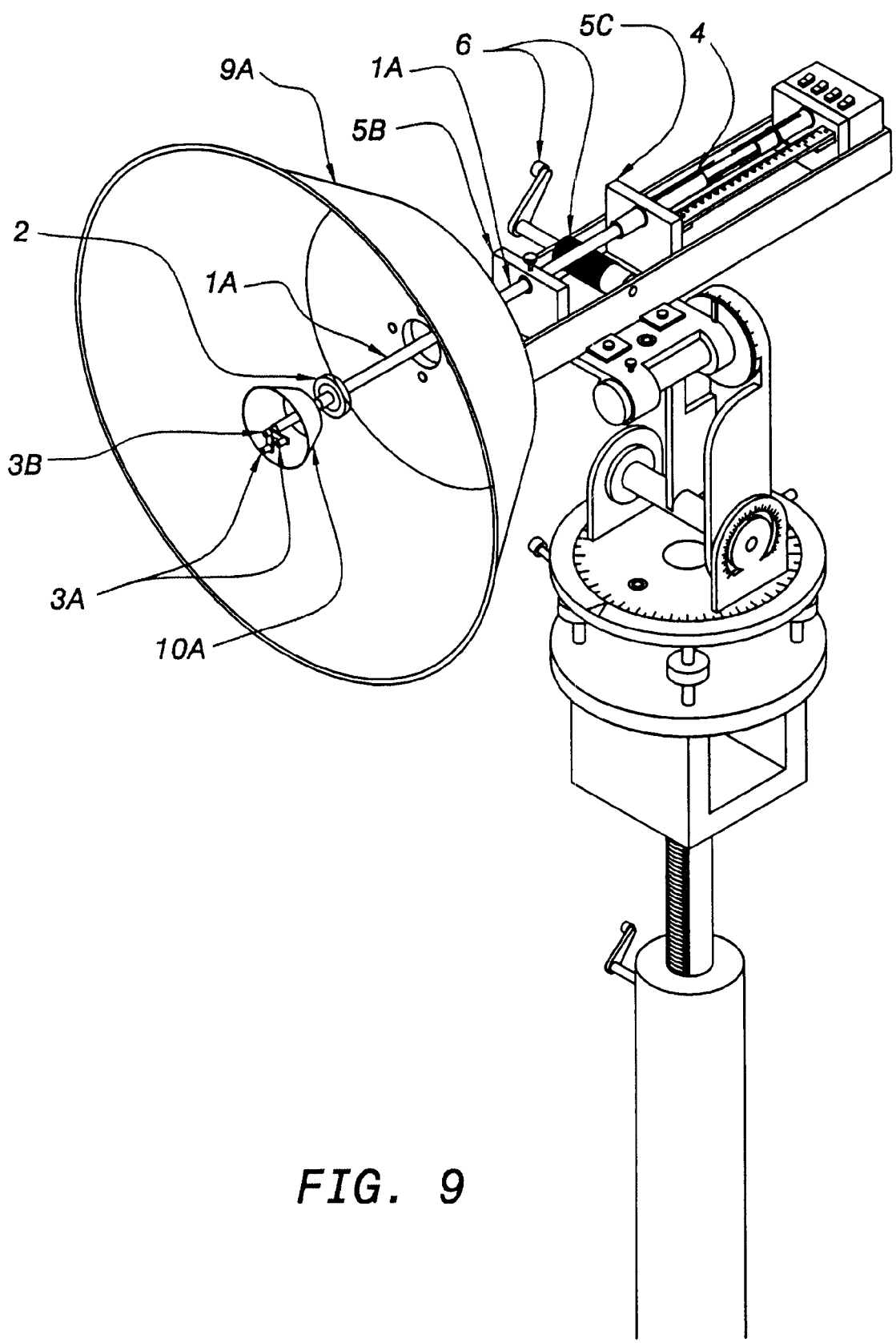
FIG. 9 is an enlarged perspective view of a portion of the apparatus shown in FIG. 1.

The above described rotational degrees of freedom are illustrated in FIG. 4. Rotation of illuminator assembly 48 about upper horizontal pin 12A provides rotation as indicated by the arrows A about the x axis in the illustrated xyz coordinate system. Rotation of illuminator assembly 48 about lower horizontal pin 13 provides rotation as indicated by the arrows B about the y axis in the illustrated xyz coordinate system. Finally, rotation of illuminator assembly 48 by rotating upper plate 14C relative to lower plate 15A provides rotation as indicated by the arrows C about the z axis in the illustrated xyz coordinate system. This rotational capability provides for the adjustment needed for projecting a column of light in a desired direction relative to a receiving surface.

Upper plate 14C is provided with a circular level indicator 14D. Most applications will be performed with the upper pin 12A locked in the zero position with the help of a set screw 12B bearing against a locking knob 12C on pin 12A. In this locked zero position, the mutually perpendicular laser light planes provided by laser light sources 3A are strictly vertical and horizontal, i.e. aligned with the planes defined by the xz and xy axes, respectively. The accuracy of this position can be verified with the two mutually perpendicular one-way level indicators 11C of water bubble type located on holding bracket 11A.

Vertical up and down adjustability of illuminator assembly 48 is achieved by the axial translation of telescoping shaft assembly 19 driven by a worm gear mechanism 20. Telescoping shaft assembly 19 is received in a vertical post 21 that is rigidly fixed to a base 22A. Vertical adjustment movement is accomplished, with a high degree of accuracy, by worm gear mechanism 20 and in accordance with work piece construction documents. In other words, telescoping shaft assembly 19 can be used to raise illuminator assembly 48 to the level it has to be in order to be positioned adjacent the receiving surface.

Base 22A of support stand 50 is equipped with a minimum of three swivel wheels 24, two of which are lockable, as well as a minimum of three vertically adjustable threaded bearing studs 23 having sole plates 23A, allowing the user to easily move support stand 50 to the desired location and to thereafter secure support stand 50. The user can secure support stand 50 in position using the adjustable bearing studs 23 that are also used for initial leveling of base 22A. Thus, during transport, wheels 24 are used to roll the apparatus of this invention from one place to another. Once in place, bearing studs 23 are lowered until the sole plates 23A are beneath the wheels 24 and engage the ground or floor. The sole plates can be individually adjusted until base 22A is level as indicated by a bubble type leveling apparatus 22B provided on base.

Alternatively, an elevated base, mounted upon a tripod, may be used in place of base 22B, similar to the arrangement found in common surveying instruments. As noted earlier, circular level indicators of water bubble type are provided on base 22B for convenience during positioning and set up. The elevation of illuminator assembly 48 above the adjustable base 22A, whether base is elevated and tripod mounted or supported on stilts just above the floor as shown in the drawings, can be read from a vertical scale (not shown) marked on the side of telescoping shaft assembly 19 at the location where telescoping shaft assembly 19 enters into post 21. An additional measurement with a ruler may be performed to obtain, if desired, the height of the adjustable base 22A above the floor so that the height of illuminator assembly 48 above the floor can thus be determined.

In addition to the leveling provided by threaded studs 23, more precise leveling of illuminator assembly 48 can also be obtained by adjusting the elevation of the leveling screws 16 which support the upper and lower plates 14C and 15A of the turntable that provides illuminator assembly 48 with rotational capability in the horizontal plane about the z axis.

Thus, support stand 50 described above allows the height of illuminator assembly 48 to be easily adjusted relative to the ground or a floor by using telescoping shaft assembly 19 to raise and lower illuminator assembly 48. In addition, illuminator assembly 48 once raised or lowered can be rotated about the xyz axes to allow illuminator assembly 48 to be pointed in a desired direction at a receiving surface. Once so oriented, operation of the various laser light sources provided on illuminator assembly 48 serves to project the intersection pattern of a cylindrical or conical object onto the receiving surface as described earlier.

The apparatus of this invention can be stored and transported in its most compact position, with telescoping shaft assembly 19 retracted inside post 21 into its lowest position.

Figure 21:
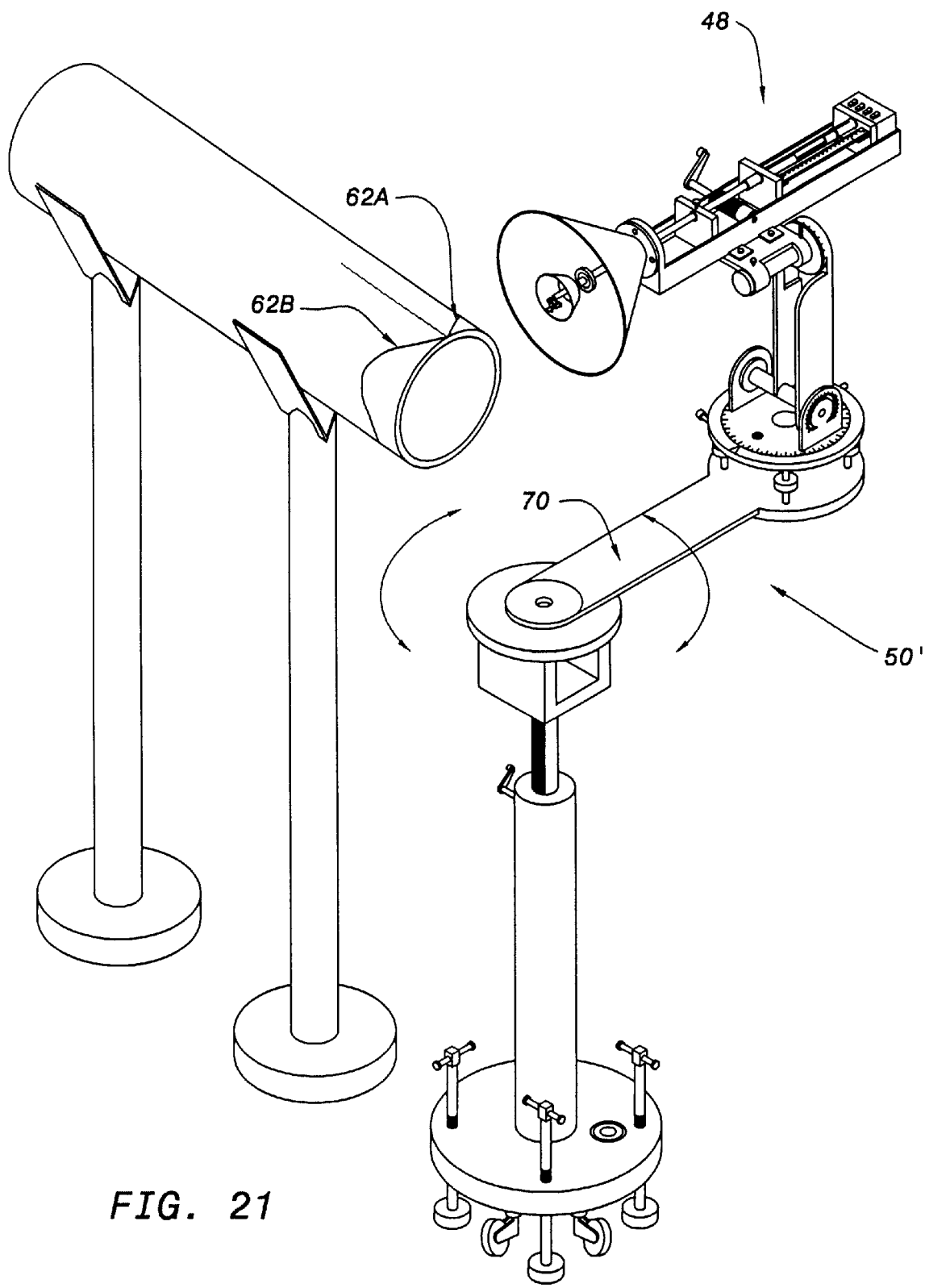
FIG. 21 is a perspective view of the apparatus according to this invention, particularly illustrating the illuminator assembly preparing the end of a pipe for joining to another component and particularly illustrating a second embodiment of a support stand for the illuminator assembly.
Figure 24:
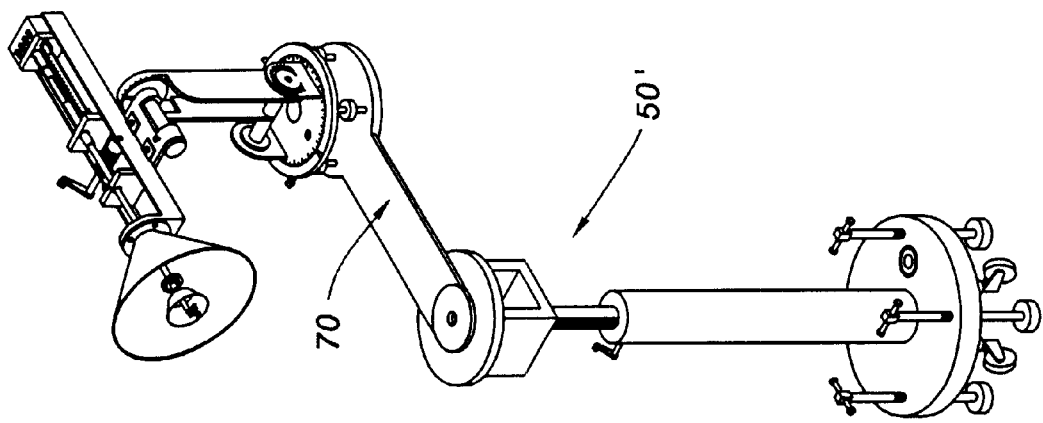
FIG. 24 is a perspective view of the apparatus according to this invention, particularly illustrating the illuminator assembly and the second embodiment of the support stand therefor as shown in FIG. 21.
Figure 23:
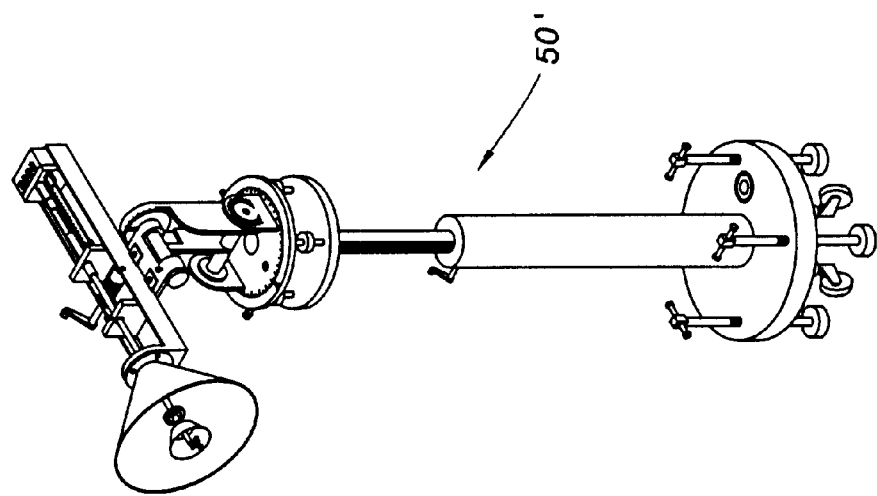
FIG. 23 is a perspective view of the apparatus according to this invention, particularly illustrating the illuminator assembly and the first embodiment of the support stand therefor as shown in FIGS. 10–12.

A second embodiment of a support stand 56' for supporting illuminator assembly 48 is shown in FIGS. 21 and 24. In support stand 50', illuminator assembly 48 is offset from telescoping shaft assembly 19 by the length of a swing or pivot arm 70. Thus, illuminator assembly 48 can be pivoted in its entirety about the axis of telescoping shaft assembly 19 by virtue of pivot arm 70. Once pivot arm 70 is an a desired location, illuminator assembly 48 is still rotationally adjustable about each of the xyz axes in the xyz coordinate system.

One use for support stand 50' is preparing a pipe end for insertion into another pipe or the like. In this use, as shown in FIG. 21. pivot arm 70 is swung so that illuminator assembly 48 faces one side of the pipe end. Then, when illuminator assembly 48 projects a cylindrical column of light representing the receiving surface to which the pipe end is to be joined, one half of this light column will be positioned to fall on the pipe end so that a first half 62a of the necessary cut in the pipe end is illustrated and can be marked. If pivot arm 70 is then swung around 180° to face the opposite side of the pipe end and this procedure is repeated, the other half 62b will be visually represented on the pipe end and can also be marked. Cutting along outlines 62a and 62b will then trim or prepare the pipe end for insertion into or abutment with another pipe. In the case of simply abutting the pipe end with an existing pipe without cutting into the existing pipe, as when the pipe end is part of a cylindrical support for the existing pipe, only the pipe end will be cut and not the existing pipe itself.

Figure 22:
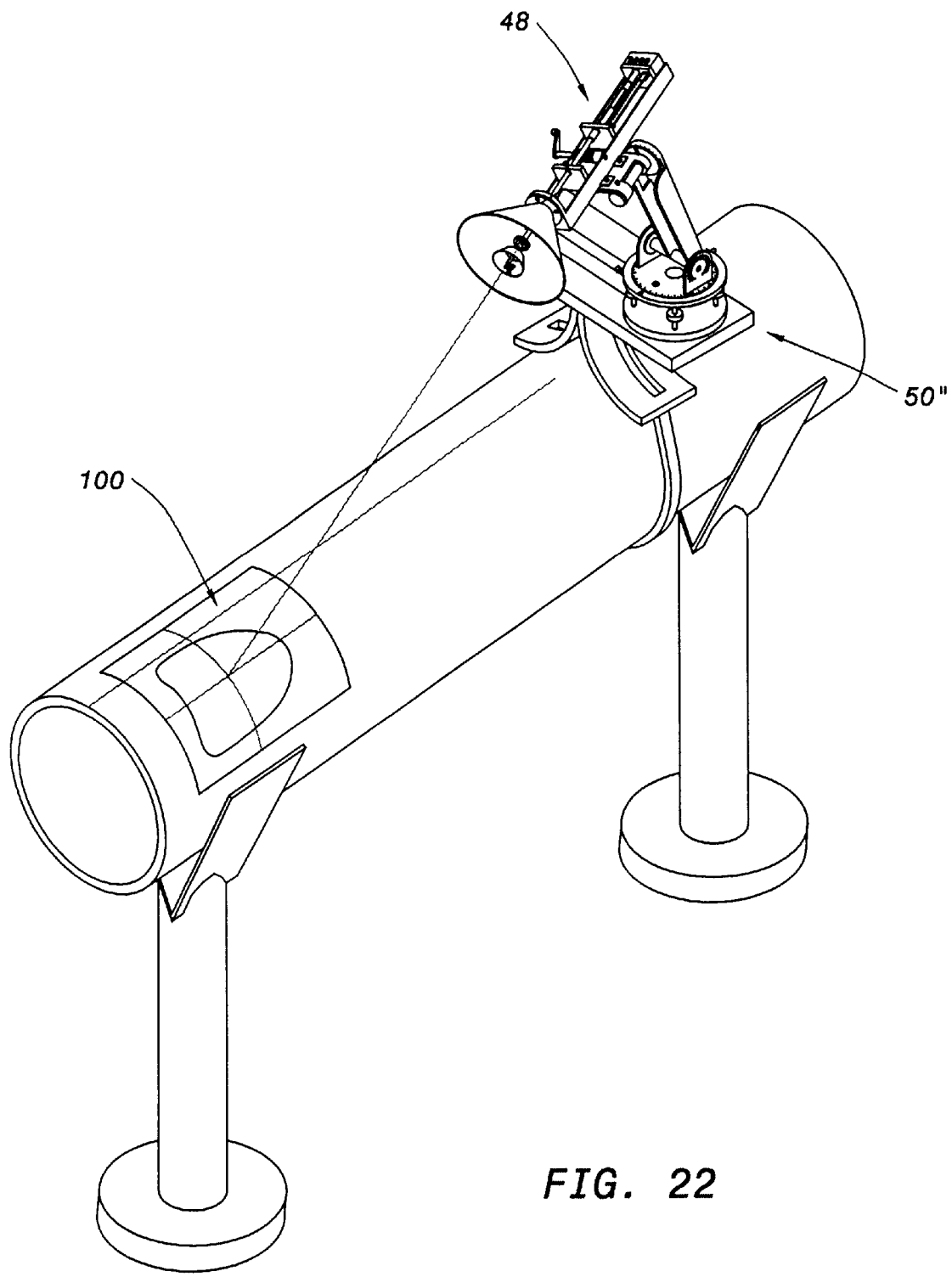
FIG. 22 is a perspective view of the apparatus according to this invention, particularly illustrating the illuminator assembly projecting an intersection pattern onto the side of a pipe, or onto a paper template laid on the pipe and particularly illustrating a third embodiment of a support stand for the illuminator assembly.
Figure 25:
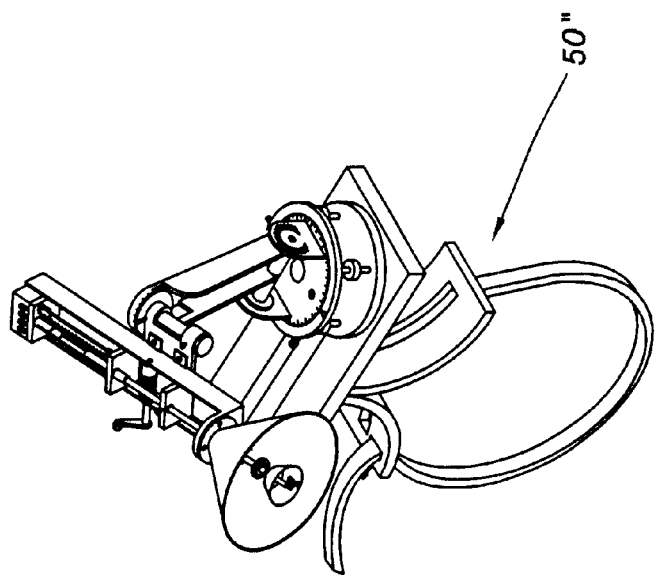
FIG. 25 is a perspective view of the apparatus according to this invention, particularly illustrating the illuminator assembly and the third embodiment of the support stand therefor as shown in FIG. 22.
Figure 26:
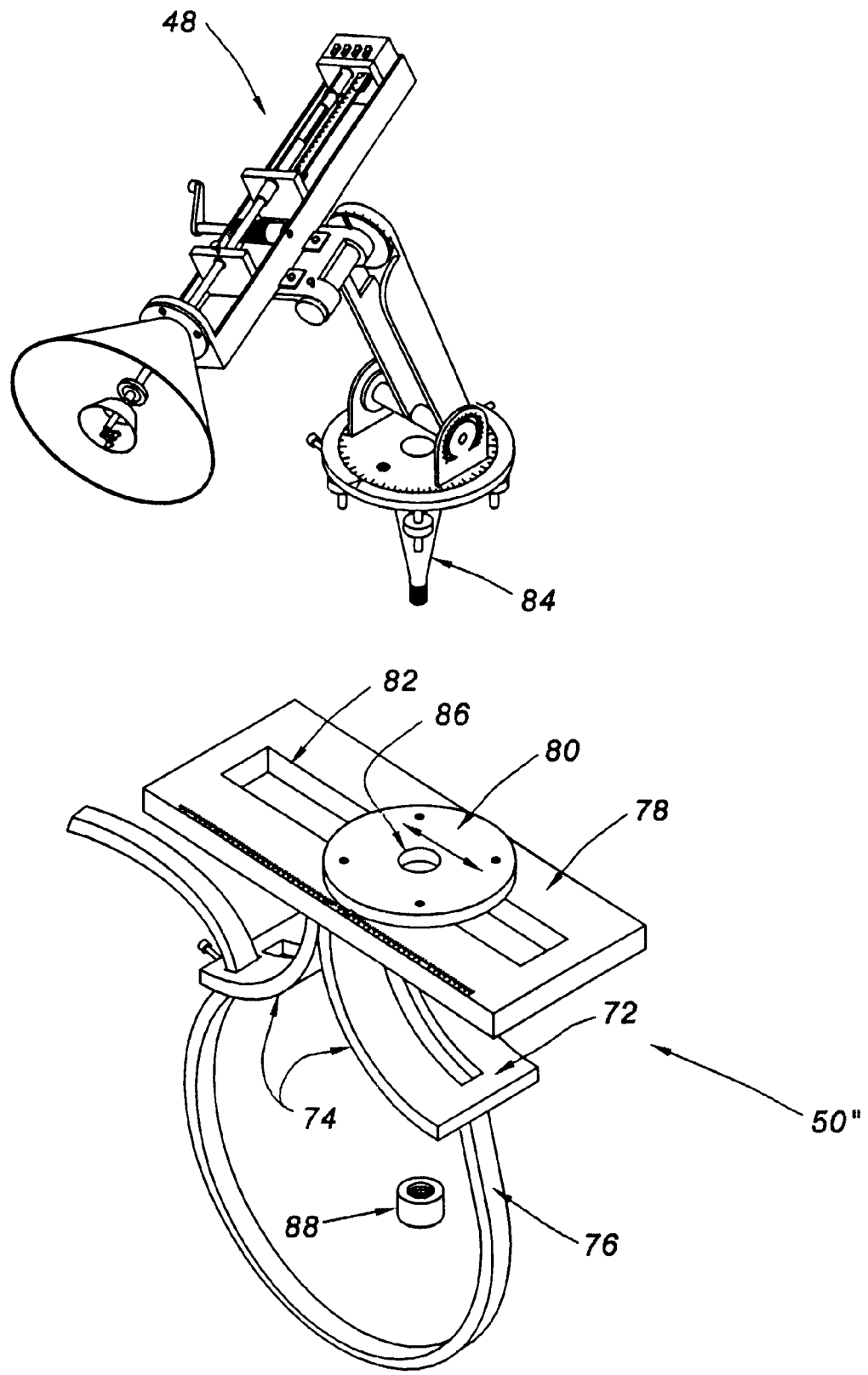
FIG. 26 is a perspective view of the apparatus according to this invention, particularly illustrating the illuminator assembly and the third embodiment of the support stand therefor as shown in FIGS. 22 and 25 with portions being shown in exploded form for the purpose of clarity.

Referring now to FIGS. 22, 25 and 26, a third support stand 50" is illustrated for mounting illuminator assembly directly on top of a pipe. Support stand 50" includes an upper saddle 72 having curved downwardly extending legs 74 adapted to about against a top side of the pipe. A tightenable cinch or strap 76 is carried on saddle 72 to allow saddle 72 to be placed on top of the pipe and clamped in place thereon. A support member 78 is fixed to top of saddle 72. A slidable support plate 80 can slide back and forth through a slot 82 in support member 78. Lower plate 15A includes a downwardly extending threaded stem 84 that passes through a hole 86 in support plate 80. A nut 88 can be tightened on stem 84 against the underside of support plate 80 to allow illuminator assembly to be carried on support plate 80.

After saddle 72 is installed on a pipe by tightening cinch or strap 76, illuminator assembly 48 can be placed in a desired lateral position relative to the pipe by sliding support plate 80 back and forth on saddle 72, using a scale 90 to help position illuminator assembly 48. A set screw or other locking means can be used to help hold support plate 80 in an adjusted position on saddle 72. Once so secured, illuminator assembly can still be rotationally adjusted about each of the xyz axes in the xyz coordinate system.

FIG. 22 shows illuminator assembly 48 mounted on support stand 50", with support stand 50" being located around a pipe with illuminator assembly 48 located on top of the pipe. Illuminator assembly 48 can then be operated to visually project an intersection pattern onto the pipe representing where a component will be desirably secured to the pipe.

Regardless of which support stand is used to carry illuminator assembly 48, such an illuminator assembly 48 desirably projects the outline 62 of an intersection pattern directly onto the receiving surface. However, if a piece of paper 100 or the like is first overlaid onto the receiving surface, as shown in FIG. 22, the intersection pattern will be projected onto the paper 100. If the paper is removed and the outline 62 of the intersection pattern is cut out, a paper template will be formed that can then be laid back down on the pipe to use for marking or cutting purposes. Preferably, paper 100 will have perpendicular axes marked on it to allow the template cut from paper 100 to be properly oriented when the template is subsequently being used.

Applications for the apparatus of this invention can are numerous and widespread. Such applications can be found in manufacturing applications or any application where one component needs to be joined to another or where one simply wishes to verify the intersection pattern of one component on another or simply wishes to verify the geometry of cylindrical and conical objects. Specifically, some of the applications for this invention include, but are by no means limited to, the equipment components of plate and shell geometry found in commercial, heavy industrial, environmental, drainage, HVAC, process and utility systems.

This invention provides high-quality, low-cost true length 3-D pattern projection and marking, and accommodates changes of geometry of cylindrical and conical shell components, as well as interconnection of these components with one or more regular, irregular, or corrugated surfaces. The apparatus of this invention is provided with various degrees of freedom and adjustability, which facilitate the access to the required locations across the work piece surface, per construction documents, such as the crown or invert of a cylindrical shell, while enabling the user to trace a wide range of attachment diameters by virtue of vertical and horizontal translation of the apparatus parts, as well as a multitude of angles of mutual orientation or intersection of the pieces through the rotational capability of the components. The apparatus of this invention is of light and efficient, yet rigid, construction, which ensures the accuracy of projection and. the precision of the resulting pattern.

Various modifications of this invention will be apparent to those skilled in the art. Thus, the scope of this invention is to be limited only by the appended claims.

We claim:

1. A method for indicating a pattern of intersection between a receiving component and a component to be joined with the receiving component, which comprises:
   (a) forming a column of light that represents physical characteristics of one of the components, wherein the one component comprises a cylindrical object, and wherein the forming step comprises forming the column of light into a cylindrical column of light that has a diameter which is substantially the same as that of an outer diameter of the cylindrical object; and
   (b) projecting the column of light formed in step (a) at least partially onto a surface of the other component such that at least a portion of the pattern of intersection is represented on the surface of the other component by the outline of that portion of the light column which contacts the surface of the other component.

2. The method of claim 1, wherein the projecting step comprises projecting the column of light fully onto the surface of the other component so that the entire intersection pattern is simultaneously represented.

3. The method of claim 2, wherein the one component comprises a hollow pipe.

4. The method of claim 1, further including marking the intersection pattern on the surface of the other component as it is being projected thereon.

5. The method of claim 1, further including interposing a piece of paper on the surface of the other component, and wherein the projecting step comprises projecting the column of light onto the piece of paper to aid in creating a paper template of the intersection pattern.

6. The method of claim 1, wherein the forming step comprises forming the column of light into a column of laser light.

7. The method of claim 1, wherein the forming step comprises forming the column of light into a cylindrical column of light that has a diameter which is exactly the same as that of the outer diameter of the cylindrical object.

8. The method of claim 1, wherein the forming step comprises forming the column of light into a cylindrical column of light that has a diameter which is slightly different from that of the outer diameter of the cylindrical object by an amount sufficient to accommodate a weld used to join the components together.

9. A method for indicating a pattern of intersection between a receiving component and a component to be joined with the receiving component, which comprises:
   (a) forming a column of light that represents physical characteristics of one of the components, wherein the one component comprises a conical object, and wherein the forming step comprises forming the column of light into a conical column of light that has a cone angle which is the same as that of the conical object; and
   (b) projecting the column of light formed in step (a) at least partially onto a surface of the other component such that at least a portion of the pattern of intersection is represented on the surface of the other component by the outline of that portion of the light column which contacts the surface of the other component.

10. The method of claim 9, wherein the projecting step comprises projecting the column of light fully onto the surface of the other component so that the entire intersection pattern is simultaneously represented.

11. A method for indicating a pattern of intersection between a receiving component and a component to be joined with the receiving component, which comprises:
   (a) forming a column of light that represents physical characteristics of one of the components, wherein the forming step comprises:
      (i) forming a plane of light extending radially outwardly from a longitudinal axis;
      (ii) directing the plane of light against a projector surface angled at 45° relative to the axis to thereby reflect the plane of light into a cylindrical column of light; and
   (b) projecting the column of light formed in step (a) at least partially onto a surface of the other component such that at least a portion of the pattern of intersection is represented on the surface of the other component by the outline of that portion of the light column which contacts the surface of the other component.

12. The method of claim 11, wherein the forming step further comprises directing the cylindrical column of light against an outer surface of a diverting cone to change the cylindrical column of light into a conical column of light.

13. An apparatus for indicating a pattern of intersection between a receiving component and a component to be joined with the receiving component, which comprises:
   (a) an illuminator assembly for projecting a column of light that represents one of the components, wherein the illuminator assembly comprises:
      (i) a light plane source for emitting a plane of laser light radially from an axis;
      (ii) a projector cone around the light plane source for intercepting and reflecting the plane of light emitted by the light plane source, the projector cone having a light intercepting and reflecting inner surface that is arranged at 45° relative to the axis to convert the plane of light into a cylindrical column of light; and
      (iii) a diverting cone within the projector cone and located to intercept the cylindrical column of light projected from the projector cone, the diverting cone being shaped to convert the cylindrical column of light into a conical column of light; and
   (b) a support stand for adjustably carrying the illuminator assembly to allow the column of light projected by the illuminator assembly to be projected onto the other component at a desired spot and in a desired direction, whereby the intersection pattern is represented by the outline of the column of light on a surface of the other component.

14. The apparatus of claim 13, wherein a single diverting cone having a hyperboloid shape is located to intercept the cylindrical column of light projected from the projector cone, and wherein the single diverting cone having the hyperboloid shape is adjustable towards and away from the light plane source to allow the conical column of light being created by the single diverting cone having the hyperboloid shape to have adjustable cone angles of inclination.

15. An apparatus for indicating a pattern of intersection between a receiving component and a component to be joined with the receiving component, which comprises:
   (a) an illuminator assembly for projecting a column of light that represents one of the components, wherein the illuminator assembly comprises:
      (i) a light plane source for emitting a plane of laser light radially from an axis;
      (ii) a projector cone around the light plane source for intercepting and reflecting the plane of light emitted by the light plane source, the projector cone having a light intercepting and reflecting inner surface that is arranged at 45° relative to the axis to convert the plane of light into a cylindrical column of light; and
      (iii) wherein the light plane source is adjustable along the axis relative to the projector cone to vary the diameter of the cylindrical column of light being created thereby; and
   (b) a support stand for adjustably carrying the illuminator assembly to allow the column of light projected by the illuminator assembly to be projected onto the other component at a desired spot and in a desired direction, whereby the intersection pattern is represented by the outline of the column of light on a surface of the other component.

16. An apparatus for indicating a pattern of intersection between a receiving component and a component to be joined with the receiving component, which comprises:
   (a) an illuminator assembly for projecting a column of light that represents one of the components, wherein the illuminator assembly comprises:
      (i) a light plane source for emitting a plane of laser light radially from an axis;
      (ii) a projector cone around the light plane source for intercepting and reflecting the plane of light emitted by the light plane source, the projector cone having a light intercepting and reflecting inner surface that is arranged at 45° relative to the axis to convert the plane of light into a cylindrical column of light; and
      (iii) a central light pointer on the axis of the illuminator assembly; and
   (b) a support stand for adjustably carrying the illuminator assembly to allow the column of light projected by the illuminator assembly to be projected onto the other component at a desired spot and in a desired direction, whereby the intersection pattern is represented by the outline of the column of light on a surface of the other component.

17. An apparatus for indicating a pattern of intersection between a receiving component and a component to be joined with the receiving component, which comprises:
   (a) an illuminator assembly for projecting a column of light that represents one of the components, wherein the illuminator assembly comprises:
      (i) a light plane source for emitting a plane of laser light radially from an axis;
      (ii) a projector cone around the light plane source for intercepting and reflecting the plane of light emitted by the light plane source, the projector cone having a light intercepting and reflecting inner surface that is arranged at 45° relative to the axis to convert the plane of light into a cylindrical column of light;
   (b) a support stand for adjustably carrying the illuminator assembly to allow the column of light projected by the illuminator assembly to be projected onto the other component at a desired spot and in a desired direction, whereby the intersection pattern is represented by the outline of the column of light on a surface of the other component; and
   (c) a set of projector cones of different sizes representing different working diameter ranges, and wherein only one of said set of projector cones is used at a time in the illuminator assembly representing a selected one of said working diameter ranges.

18. A method for indicating a pattern of intersection between a first structural component and a second structural component having an end which is to be joined with the first structural component, which comprises:

(a) forming a column of light that represents the end of the second component independently of the second component such that the forming step takes place without requiring that the second component be positioned adjacent the first component; and (b) projecting the column of light formed in step (a) fully onto a surface of the first component such that the outline of the light column as it contacts the surface of the first component illustrates the pattern of intersection that should be cut on the first component to thereby join the end of the second component to the first component.

19. A method for indicating a pattern of intersection between a first structural component and a second structural component having an end which is to be joined with the first structural component, which comprises:

(a) forming a column of light that represents the first structural component;

(b) projecting this column of light at least partially on one side of the end of the second component and then projecting this column of light at least partially on an opposite side of the end of the second component to illustrate on the end of the second component the pattern of intersection between the first component and the end of the second component to thereby allow this pattern of intersection to be cut on the end of the second component to allow the end of the second component to be prepared for being joined to the first component.

* * * * *